(12) United States Patent
Hayashi

(10) Patent No.: US 10,204,027 B2
(45) Date of Patent: Feb. 12, 2019

(54) LOG INFORMATION COLLECTION SYSTEM AND LOG INFORMATION COLLECTION METHOD

(71) Applicant: FUJITSU LIMITED, Kawasaki-shi, Kanagawa (JP)

(72) Inventor: Yusuke Hayashi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 107 days.

(21) Appl. No.: 15/298,537

(22) Filed: Oct. 20, 2016

(65) Prior Publication Data

US 2017/0123955 A1    May 4, 2017

(30) Foreign Application Priority Data

Nov. 2, 2015 (JP) ................................. 2015-215411

(51) Int. Cl.
 *G06F 11/34* (2006.01)
 *G06F 11/30* (2006.01)

(52) U.S. Cl.
 CPC ...... *G06F 11/3476* (2013.01); *G06F 11/3034* (2013.01); *G06F 11/3495* (2013.01)

(58) Field of Classification Search
 CPC .............................. G06F 11/34; G06F 11/3476
 USPC ........................................................ 714/45
 See application file for complete search history.

(56) References Cited

U.S. PATENT DOCUMENTS

| | | | | |
|---|---|---|---|---|
| 5,742,792 A * | 4/1998 | Yanai | .................... | G06F 3/0601 710/1 |
| 5,889,935 A * | 3/1999 | Ofek | .................. | G06F 11/2066 709/217 |
| 6,226,651 B1 * | 5/2001 | Masuda | .............. | G06F 11/1471 |
| 7,111,189 B1 * | 9/2006 | Sicola | ................. | G06F 11/2092 714/15 |
| 7,707,453 B2 * | 4/2010 | Winokur | ............. | G06F 11/1441 711/161 |
| 8,024,442 B1 * | 9/2011 | Roussos | ................ | G06F 3/0605 709/223 |
| 2005/0060609 A1 * | 3/2005 | El-Batal | ............. | G06F 11/1076 714/20 |

(Continued)

FOREIGN PATENT DOCUMENTS

| | | |
|---|---|---|
| JP | 2006-178555 | 7/2006 |
| JP | 2014-532932 | 12/2014 |

*Primary Examiner* — Kamini B Patel
(74) *Attorney, Agent, or Firm* — Oblon, McClelland, Maier & Neustadt, L.L.P.

(57) ABSTRACT

A log information collection system includes a first storage device, to-be-monitored devices each including a second memory, a monitor device including a third processor, and a management device including a fourth processor. The third processor is configured to allocate a storage region of the first storage device to each of the to-be-monitored devices and control each of the to-be-monitored devices to copy first log information among log information stored in the second memory to the allocated storage region. The fourth processor is configured to collect the first log information stored in the first storage device, when a failure occurred in any of the to-be-monitored devices is detected, by accessing a second storage device to which the first log information is copied from the first storage device or by accessing the first storage device through a first access channel established between the management device and the first storage device.

15 Claims, 26 Drawing Sheets

(56) References Cited

U.S. PATENT DOCUMENTS

| | | | |
|---|---|---|---|
| 2005/0193248 A1* | 9/2005 | Idei | G06F 11/2074 |
| | | | 714/13 |
| 2005/0223267 A1* | 10/2005 | Fujibayashi | G06F 11/2058 |
| | | | 714/5.11 |
| 2008/0209258 A1* | 8/2008 | Casale | H04L 41/00 |
| | | | 714/4.1 |
| 2009/0019096 A1* | 1/2009 | Kern | G06F 11/2058 |
| 2014/0324778 A1* | 10/2014 | Bonnell | G06F 17/30575 |
| | | | 707/634 |
| 2014/0372800 A1* | 12/2014 | Garza | G06F 11/2097 |
| | | | 714/20 |
| 2015/0312337 A1* | 10/2015 | Keremane | H04L 67/1095 |
| | | | 709/217 |

\* cited by examiner

FIG. 8A

| FAILURE ID | IP ADDRESS OF BUSINESS SERVER | IP ADDRESS OF STORAGE DEVICE | LVID | MOUNT POINT IN GATEWAY SERVER |
|---|---|---|---|---|
| 1 | 10.0.0.2 | 192.168.0.3 | 3 | None |
| 2 | 10.0.0.3 | 192.168.0.3 | 4 | /mnt/problem3 |
| 3 | 10.0.0.4 | 192.168.0.3 | 5 | /mnt/problem4 |
| 4 | 10.0.0.5 | 192.168.0.3 | 6 | None |

FIG. 8B

| FAILURE ID | IP ADDRESS OF STORAGE DEVICE | LVID | MOUNT POINT IN MANAGEMENT SERVER |
|---|---|---|---|
| 1 | 192.168.2.3 | 21 | /mnt/problem2 |
| 4 | 192.168.2.3 | 28 | /mnt/problem9 |

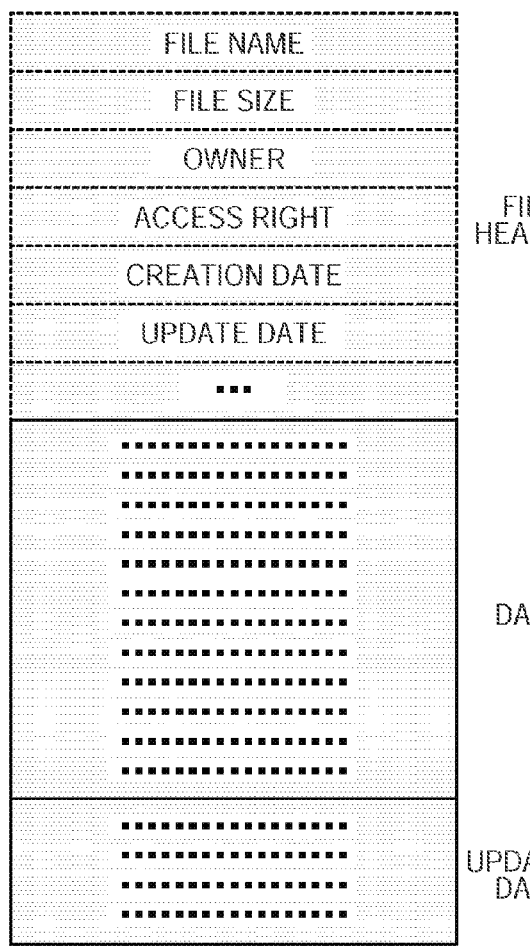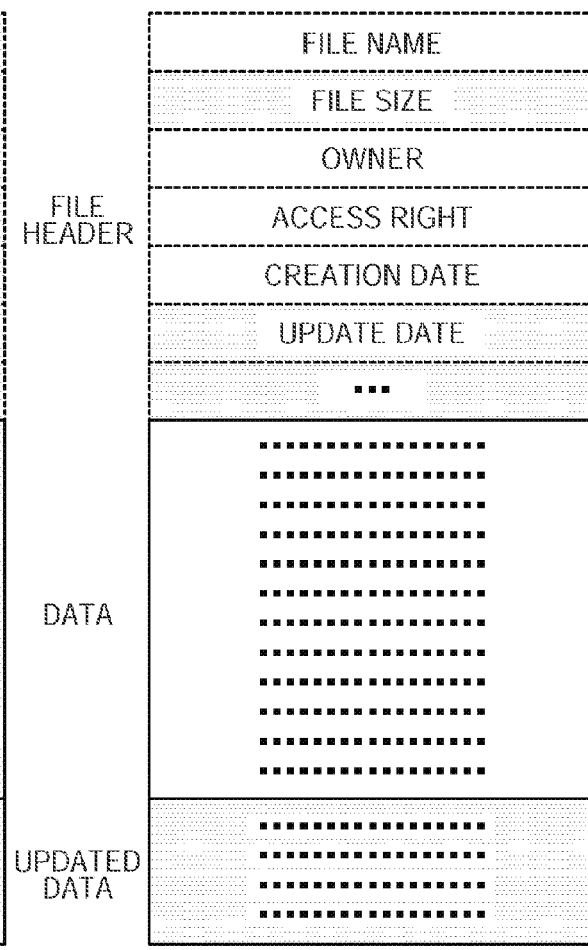
FIG. 9A
FIG. 9B

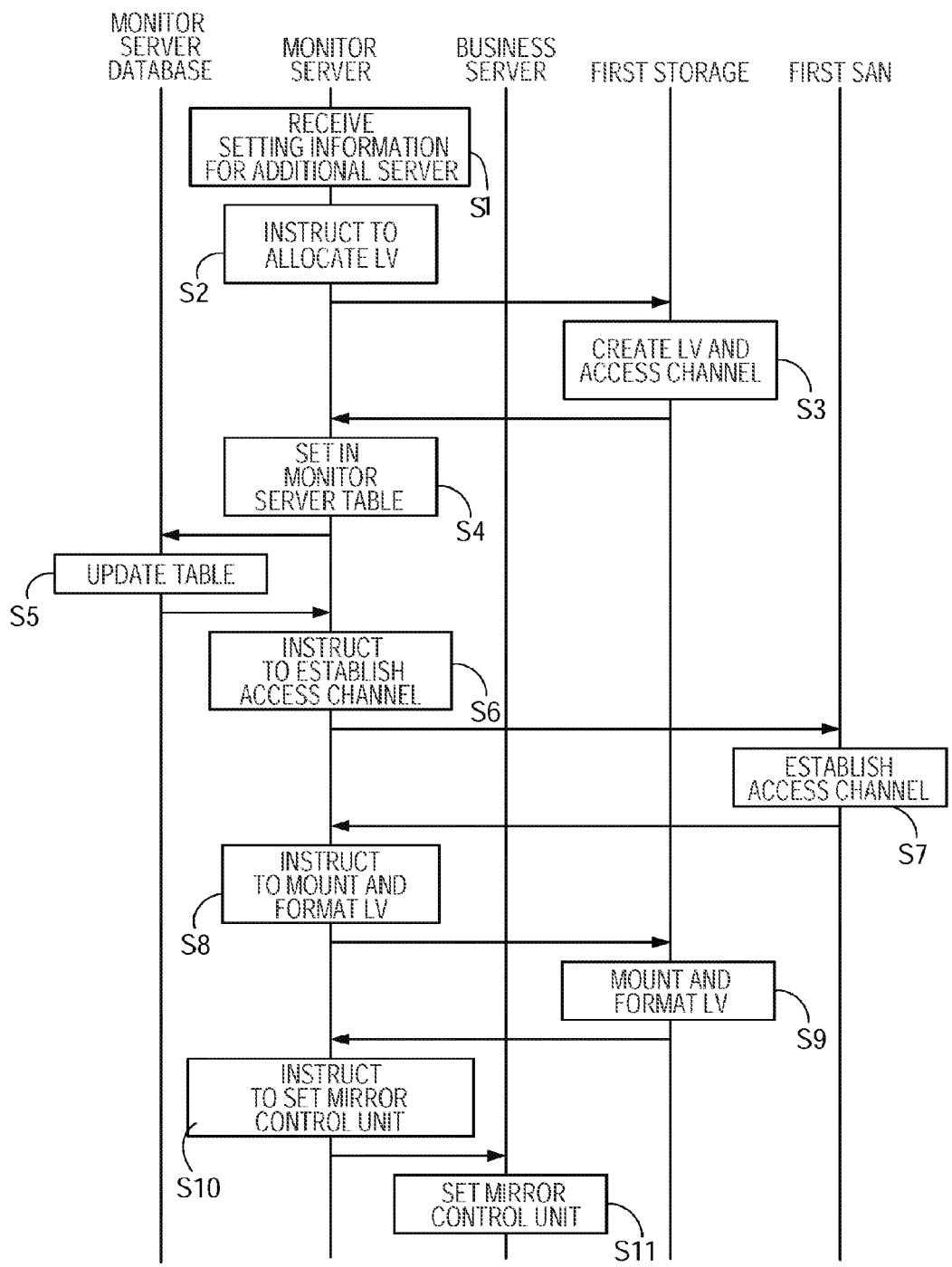

LOG INFORMATION COLLECTION SYSTEM AND LOG INFORMATION COLLECTION METHOD

CROSS-REFERENCE TO RELATED APPLICATION

This application is based upon and claims the benefit of priority of the prior Japanese Patent Application No. 2015-215411, filed on Nov. 2, 2015, the entire contents of which are incorporated herein by reference.

FIELD

The embodiment discussed herein is related to a log information collection system and a log information collection method.

BACKGROUND

In recent years, a plurality of servers (hereinafter, referred to as business servers) have been intensively operated in a predetermined facility. This facility is also referred to as a data center. Data centers are installed by being distributed into a plurality of places and tend to be collectively managed by a management center.

The management center collects pieces of log information regarding conditions of business servers operated in the respective data centers, and manages states of the respective business servers on the basis of the collected pieces of log information.

Related techniques include, for example, a technique in which a transaction history is mirrored to a disaster recovery site together with other pieces of data received from a main data center. In addition, related techniques include a technique in which a non-volatile memory storing pieces of event information such as pieces of error information is mirrored and is removably configured.

Related techniques are disclosed in, for example, Japanese National Publication of International Patent Application No. 2014-532932 and Japanese Laid-open Patent Publication No. 2006-178555.

While business servers installed in respective data centers are operated, pieces of log information regarding the business servers are frequently changed. In this case, it is preferable that a management center collects the latest log information of the business servers.

However, while the business servers are operated, the pieces of log information are frequently changed. Accordingly, when a business server performs a process of transmitting the latest log information to the management center whenever the log information is changed, a load on the business server is increased.

SUMMARY

According to an aspect of the present invention, provided is a log information collection system including a first storage device, to-be-monitored devices, a monitor device, and a management device. The first storage device includes a first memory, and a first processor coupled to the first memory. The to-be-monitored devices are each coupled to the first storage device. The to-be-monitored devices each include a second memory, and a second processor coupled to the second memory. The monitor device is coupled to the first storage device and the to-be-monitored devices. The monitor device includes a third memory and a third processor coupled to the third memory. The third processor is configured to allocate a storage region of the first storage device to each of the to-be-monitored devices. The third processor is configured to control each of the to-be-monitored devices to copy first log information among log information stored in the second memory to the allocated storage region. The first log information is designated in advance. The management device is coupled to the monitor device. The management device includes a fourth memory and a fourth processor coupled to the fourth memory. The fourth processor is configured to collect the first log information stored in the first storage device, when a failure occurred in any of the to-be-monitored devices is detected, by accessing a second storage device to which the first log information is copied from the first storage device or by accessing the first storage device through a first access channel established between the management device and the first storage device. The first access channel includes none of the monitor device and the to-be-monitored devices.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8A is a diagram illustrating an example of a monitor server table;

FIG. 8B is a diagram illustrating an example of a management server table;

FIG. 9A is a diagram illustrating an example of information transmitted when log information has been updated;

FIG. 9B is a diagram illustrating an example of information transmitted when log information has been updated;

FIG. 10 is a sequence chart illustrating an example of a process of adding a to-be-monitored server;

DESCRIPTION OF EMBODIMENT

Hereinafter, an example of a log information collection system according to an embodiment will be described with reference to the accompanying drawings. The log information collection system according to the embodiment has two patterns of a case where a storage device is installed in a management system and a case where a storage device is not installed in a management system. Hereinafter, a storage device may be simply referred to as a "storage".

Figure 1:
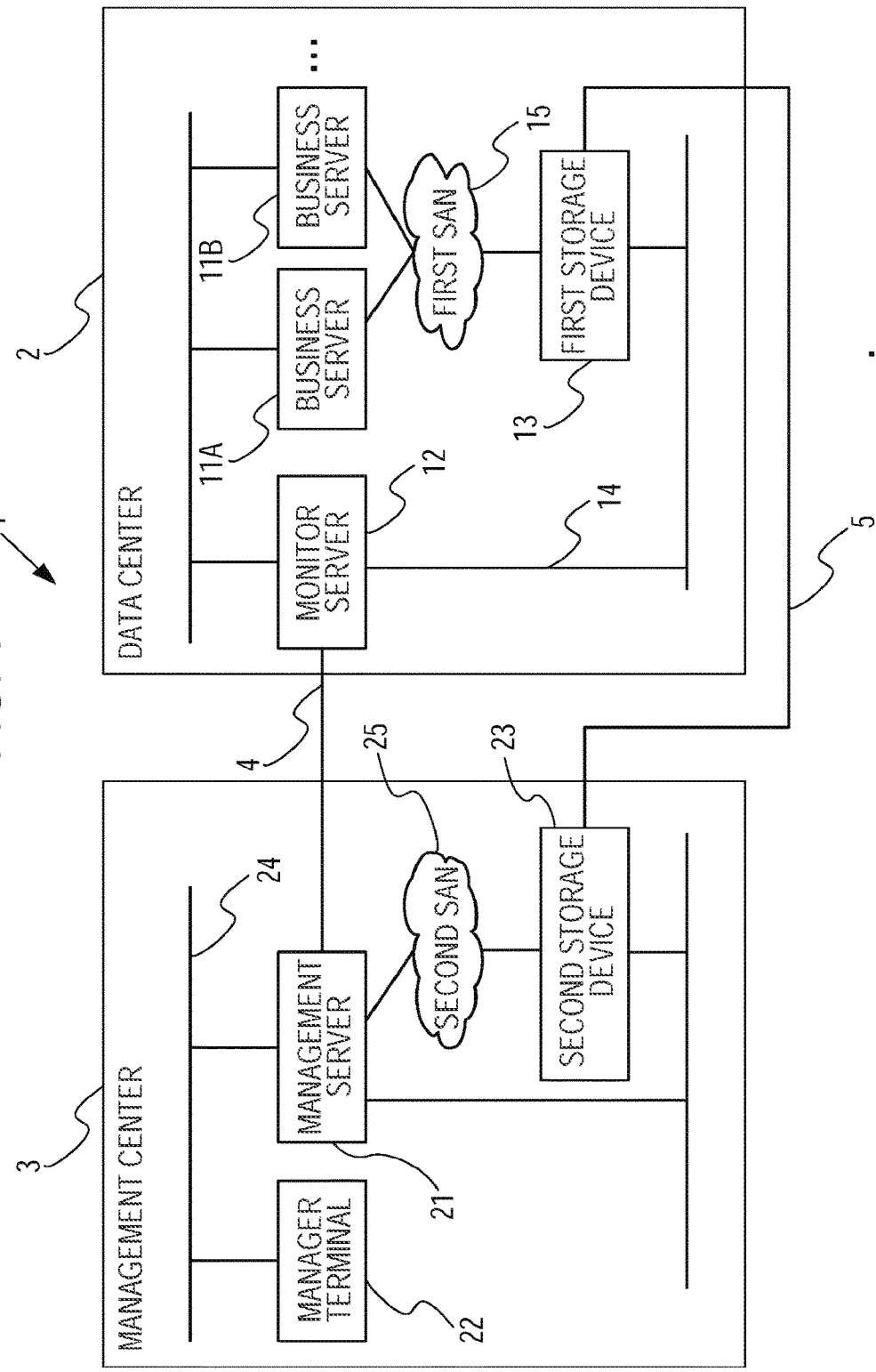
FIG. 1 is a diagram illustrating an example of a system according to an embodiment.

FIG. 1 illustrates an example of a log information collection system 1 (hereinafter, simply referred to as a system) in a case where a storage device is installed in a management center. The system 1 includes a data center 2 and a management center 3. FIG. 1 illustrates an example in a case where there are a plurality of data centers 2. However, the number of the data centers 2 may be one.

The data center 2 is a facility in which a plurality of business servers 11 for operating predetermined business are installed. The data center 2 performs management, operation, and the like of each of the business servers 11. The management center 3 is a facility for collectively managing each of the business servers 11 operated in the plurality of data centers 2.

Each of the data centers 2 and the management center 3 are coupled to each other by an external network 4 and an inter-storage communication channel 5. Each of the data centers 2 is installed in a place separated from the management center 3.

The data center 2 will be described. The data center 2 includes a plurality of business servers 11A, 11B, . . . (collectively referred to as business servers 11), a monitor server 12, a first storage device 13, a first internal network 14, and a first SAN 15. The SAN is short for a storage area network which is a network that couples storage devices to each other.

Each business server 11 is a device that operates predetermined business. In the example of FIG. 1, business servers 11 other than the business server 11A and the business server 11B are also installed in the data center 2. The number of business servers 11 installed in the data center 2 may be one.

One business affair may be operated by a plurality of business servers 11, and a plurality of business affairs may be operated by one business server 11. The business server 11 is monitored by the monitor server 12. The business server 11 is an example of a to-be-monitored device.

The business server 11 may operate the business affair by executing a predetermined application program (hereinafter, simply referred to as an application).

The monitor server 12 is a device that monitors operation conditions of each of the business servers 11. The monitor server 12 is an example of a monitor device. Each of the business servers 11 includes a storage unit. Each of the business servers 11 performs control of storing log information regarding the operation, state, and the like of the business server 11 in the storage unit.

For example, in a case where log information is newly added, each of the business servers 11 stores the added log information in the storage unit. In a case where existing log information stored in the storage unit is to be updated, each of the business servers 11 updates the log information stored in the storage unit.

When performing addition or update of log information with respect to the storage unit, each of the business servers 11 also performs the addition or update of log information with respect to the first storage device 13. In other words, a copy of contents of the storage unit of each of the business servers 11 is also stored in the first storage device 13. This process is also referred to as mirroring.

The first storage device 13 is a device that stores therein the log information. The first storage device 13 has functions of performing execution of a predetermined process, communication, and the like, in addition to storing log information.

The first storage device 13 is divided into a plurality of logical volumes (LVs). The logical volume is an example of a storage region. The logical volumes of the first storage device 13 are allocated respectively to the business servers 11 installed in the data center 2. In other words, one logical volume is allocated to one business server 11.

The first internal network 14 is a network that couples each of the business servers 11, the monitor server 12, and the first storage device 13 to each other, and is a network inside the data center 2. The first internal network 14 may be, for example, a local area network (LAN).

The first SAN 15 couples each of the business servers 11 and the first storage device 13 to each other. The SAN is a storage network for coupling a storage device and a server to each other. The SAN is constructed as a network different from the LAN.

It is assumed that the SAN according to the embodiment is constructed as a network using an optical fiber cable. A data communication speed using the SAN is higher than a data communication speed using the LAN. The data communication speed using the LAN is higher than a data communication speed using the external network 4.

When performing addition or update of log information, the business server 11 transmits the added log information or the updated information to the first storage device 13 through the first SAN 15. The first storage device 13 stores the received information in the logical volume allocated to the business server 11 which is a transmission source of the log information. When log information is updated, the business server 11 transmits information of an updated portion to the first storage device 13 rather than transmitting the log information in a file format.

The first SAN 15 is a network installed inside the data center 2, and is a high speed network that couples a server and a storage device to each other. The business server 11 may store added information or updated information in the first storage device 13 with substantially the same load and speed as in a case where information is stored in the storage unit of the business server 11.

For this reason, the business server 11 may handle a logical volume allocated thereto in the first storage device 13 in the same manner as an auxiliary storage device built therein. Thereby, the business server 11 may store information in the logical volume allocated thereto in the first storage device 13 with a low load and at a high speed.

Next, the management center 3 will be described. The management center 3 includes a management server 21, a manager terminal 22, a second storage device 23, a second internal network 24, and a second SAN 25.

The management server 21 is coupled to the monitor server 12 through the external network 4. In a case where the occurrence of a failure in a business server 11 is detected by the monitor server 12, the management server 21 recognizes the failure on the basis of a failure detection notice which is transmitted from the monitor server 12. The management server 21 is an example of a management device.

In a case where the management server 21 recognizes the occurrence of a failure, the management server 21 collects log information regarding the business server 11 in which the occurrence of the failure is detected. In a case where the second storage device 23 is installed in the management center 3, the management server 21 collects log information copied from the first storage device 13 to the second storage device 23 through the second SAN 25.

The manager terminal 22 is, for example, a terminal which is operated by a manager of the management center 3. The manager terminal 22 may display, for example, a notice indicating the detection of occurrence of a failure in the business server 11, on a screen.

The second storage device 23 and the first storage device 13 are coupled to each other through the inter-storage communication channel 5. It is assumed that the second storage device 23 is divided into a plurality of logical volumes, similar to the first storage device 13.

In a case where it is detected that a failure has occurred in any business server 11 in the data center 2, the first storage device 13 copies log information, which is stored in a logical volume allocated to the business server 11 having the failure occurred therein, to a logical volume of the second storage device 23.

The second internal network 24 is a network that couples the management server 21, the manager terminal 22, and the second storage device 23 to each other, and is a network inside the management center 3. The second internal network 24 may be, for example, a LAN.

The second SAN 25 is a SAN that couples the management server 21 and the second storage device 23 to each other. Similarly to the first SAN 15, the second SAN 25 is constructed as a network different from the second internal network 24.

Figure 2:
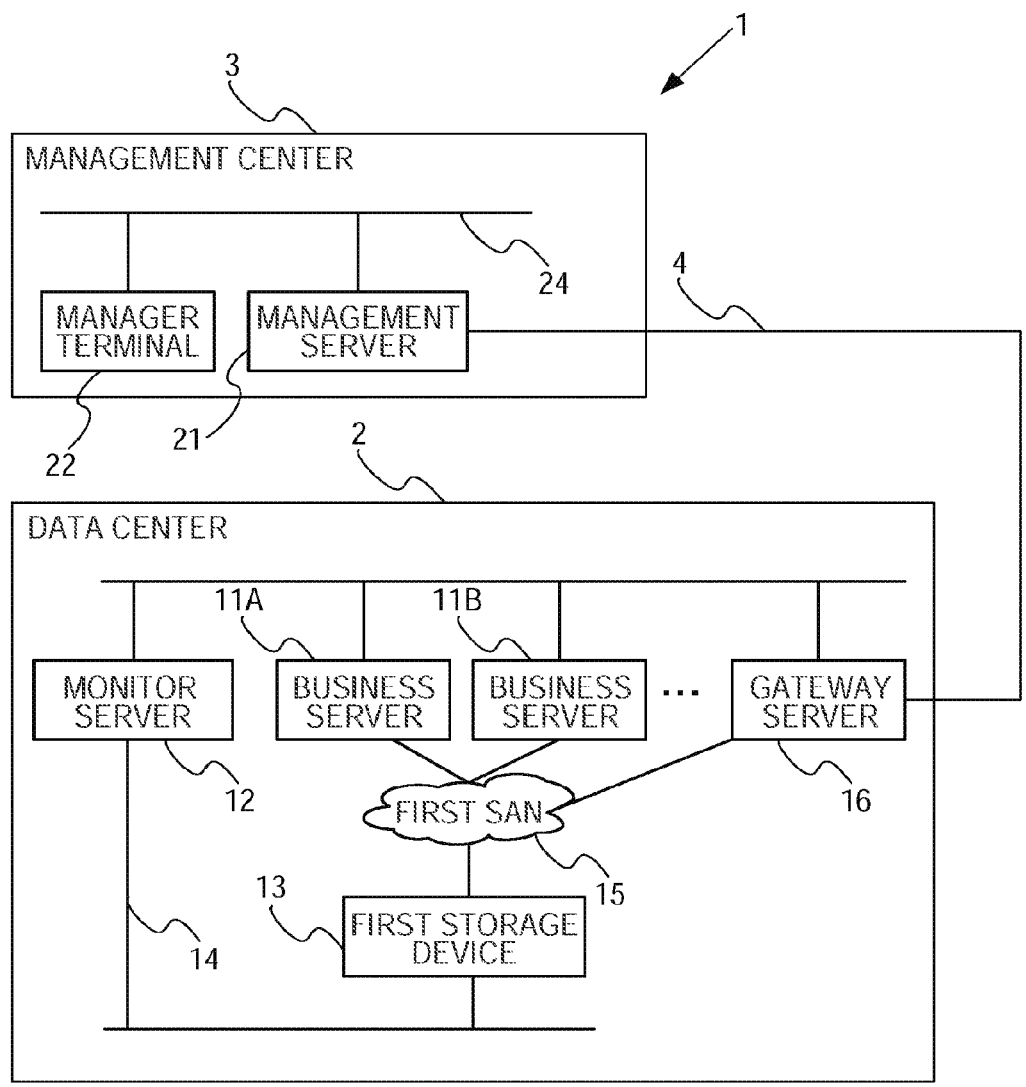
FIG. 2 is a diagram illustrating an example of a system according to an embodiment.

FIG. 2 illustrates an example of the system 1 in a case where the second storage device 23 is not installed in the management center 3. As illustrated in the example of FIG. 2, the management center 3 does not include the second storage device 23 and the second SAN 25 that are illustrated in the example of FIG. 1.

In the case where the second storage device 23 is not installed in the management center 3, a gateway server 16 is installed in the data center 2, as illustrated in the example of FIG. 2.

The gateway server 16 is coupled to the management server 21 of the management center 3 through the external network 4. In a case of the example of the system 1 of FIG. 2, the management server 21 collects log information from a logical volume of the first storage device 13 through the gateway server 16 and the first SAN 15.

Hereinafter, a business server, a monitor server, a management server, and a storage will be described. Each device to be described below is applied to both the system 1 in a case where the second storage device 23 is installed in the management center 3 and the system 1 in a case where the second storage device 23 is not installed in the management center 3.

Hereinafter, a process in the case where the second storage device 23 is installed in the management center 3 may be referred to as method_A, and a process in the case where the second storage device 23 is not installed in the management center 3 may be referred to as method_B.

Figure 3:
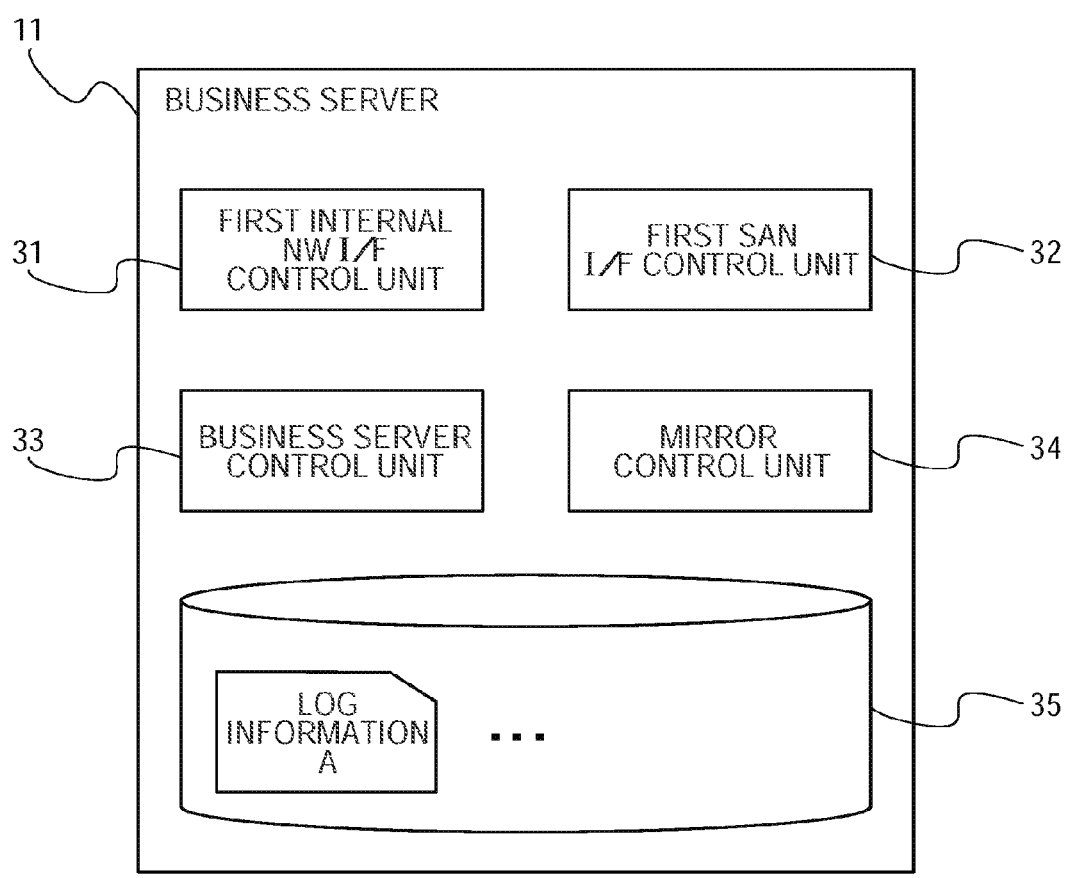
FIG. 3 is a diagram illustrating an example of a business server.

Next, an example of the business server 11 which is installed in the data center 2 will be described with reference to FIG. 3. The business server 11 includes a first internal network interface control unit 31, a first SAN interface control unit 32, a business server control unit 33, a mirror control unit 34, and a storage unit 35.

The first internal network interface control unit 31 controls an interface coupled to the first internal network 14. In FIG. 3 and the subsequent drawings, a network may be referred to as a "NW", and an interface may be referred to as an "I/F".

The first SAN interface control unit 32 controls an interface for transmitting log information to the first storage device 13 through the first SAN 15.

The business server control unit 33 performs a variety of controls of the business server 11. For example, the business server control unit 33 executes a predetermined application and generates log information regarding the execution of the application.

In a case where the business server control unit 33 newly generates log information, the business server control unit 33 stores the generated log information in the storage unit 35. Thereby, log information is newly added to the storage unit 35. The business server control unit 33 may update the log information stored in the storage unit 35.

When the business server control unit 33 adds log information to the storage unit 35, the mirror control unit 34 performs control of storing the added log information in a logical region allocated to the business server 11 in the first storage device 13.

When the business server 11 updates the log information stored in the storage unit 35, the mirror control unit 34 performs control of updating log information stored in the logical region allocated to the business server 11 in the first storage device 13.

Accordingly, a copy of the storage unit 35 of the business server 11 is created by the mirror control unit 34 in the logical region allocated to the business server 11 in the first storage device 13.

Thereby, identical contents to contents of the log information stored in the storage unit 35 are stored in the logical volume of the first storage device 13. In the embodiment, it is assumed that the mirror control unit 34 is realized by executing a mirror program.

Figure 4:
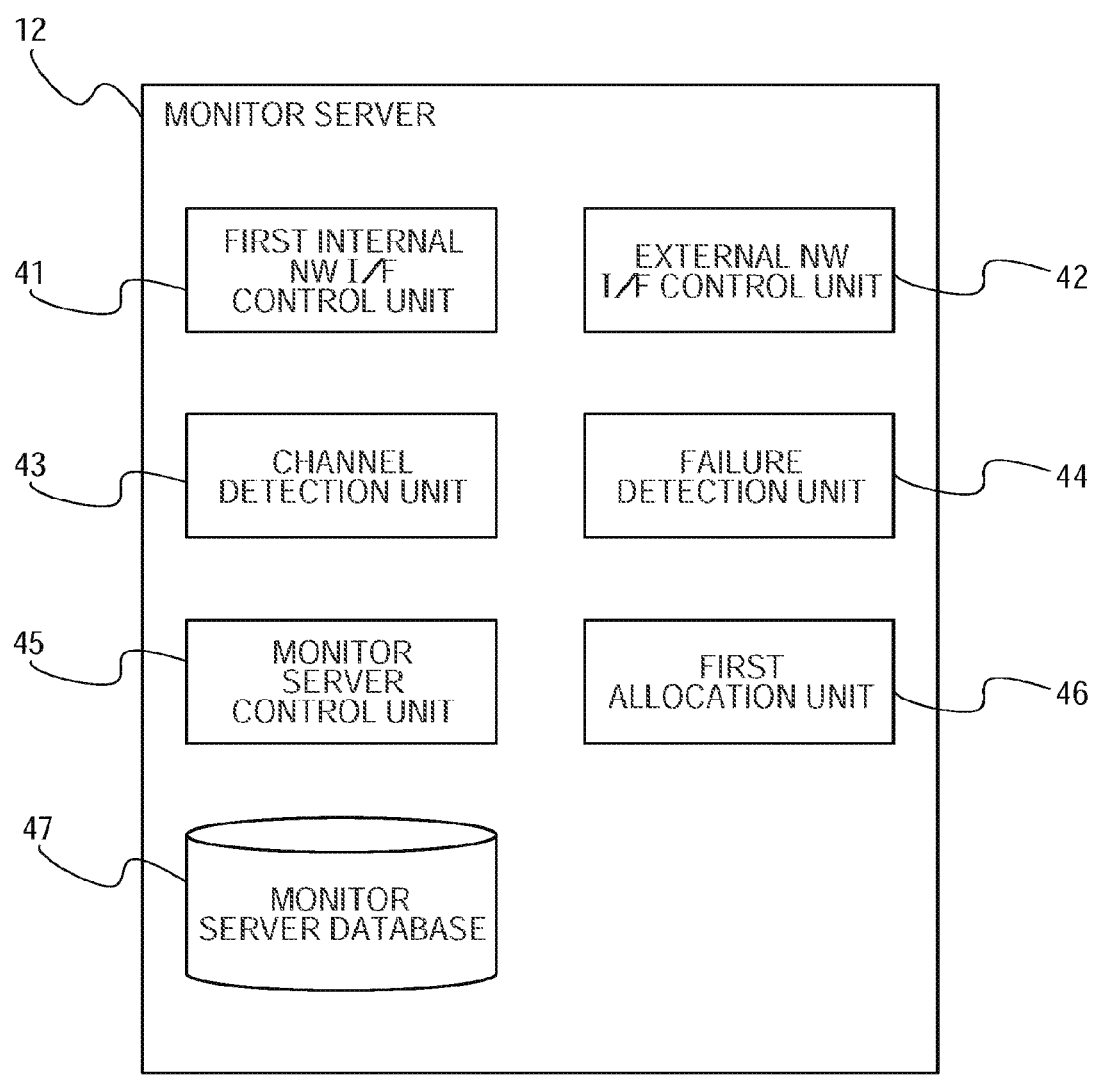
FIG. 4 is a diagram illustrating an example of a monitor server.

Next, an example of the monitor server 12 installed in the data center 2 will be described with reference to FIG. 4. The monitor server 12 includes a first internal network interface control unit 41, an external network interface control unit 42, a channel detection unit 43, a failure detection unit 44, a monitor server control unit 45, a first allocation unit 46, and a monitor server database 47.

The first internal network interface control unit 41 controls an interface coupled to the first internal network 14. The external network interface control unit 42 controls an interface coupled to the external network 4.

The channel detection unit 43 detects whether or not the inter-storage communication channel 5 is coupled to the first storage device 13.

The failure detection unit 44 detects a failure occurring in each of the business servers 11 installed in the data center 2. For example, the failure detection unit 44 may detect a failure by receiving a notice of the occurrence of a failure from each of the business servers 11 through the first internal network 14.

The failure detection unit 44 may detect a failure by checking conditions of each of the business servers 11 on a regular basis. In a case where the failure detection unit 44 detects the occurrence of a failure, the failure detection unit 44 transmits a failure occurrence notice to the management center 3.

The monitor server control unit 45 performs a variety of controls of the monitor server 12. The monitor server control unit 45 is an example of a control unit. In a case where the channel detection unit 43 detects that the inter-storage communication channel 5 is coupled to the first storage device 13, log information stored in the first storage device 13 is copied to the second storage device 23 upon the detection of a failure. The copy is also referred to as remote mirror.

In this case, the monitor server control unit 45 controls the first storage device 13 to copy log information stored in a logical region, which is allocated to the business server 11 in which the occurrence of a failure is detected, to one logical volume of the second storage device 23.

In a case where the channel detection unit 43 detects that the inter-storage communication channel 5 is not coupled to the first storage device 13, the gateway server 16 is installed in the data center 2. The gateway server 16 is coupled to the first SAN 15.

Accordingly, in a case where the channel detection unit 43 detects that the inter-storage communication channel 5 is not coupled to the first storage device 13, the monitor server control unit 45 performs control of establishing an access channel between the gateway server 16 and the first storage device 13.

In a case where the first allocation unit 46 allocates a logical volume of the first storage device 13 to a new business server 11, the first allocation unit 4 allocates a logical volume, which is not allocated to any business server 11, to the new business server 11.

As described above, the mirror control unit 34 is realized by executing a mirror program. In a case where a business server 11 is newly added, the monitor server control unit 45 transmits an installation program for installing the mirror program to the newly added business server 11.

The business server 11 executes the installation program and then executes the mirror program, thereby setting a function of the mirror control unit 34 in the business server 11.

The monitoring of a business server 11 by the monitor server 12 may be cancelled. In this case, the monitor server control unit 45 invalidates the mirror control unit 34 of a to-be-excluded business server 11 which is the business server 11 to be excluded from targets for the monitoring. For example, the monitor server control unit 45 may delete the mirror program from the to-be-excluded business server 11.

All of the pieces of log information stored in the storage unit 35 of the business server 11 are not necessarily mirrored. The monitor server control unit 45 sets a to-be-mirrored log, which is the log information to be mirrored, in the mirror control unit 34 of the business server 11.

For example, the monitor server control unit 45 may newly add a to-be-mirrored log to the mirror control unit 34, and may exclude a to-be-mirrored log.

The monitor server database 47 stores therein a monitor server table. Information stored in the monitor server table is used when the monitor server control unit 45, the first allocation unit 46, and the like perform a variety of controls.

Figure 5:
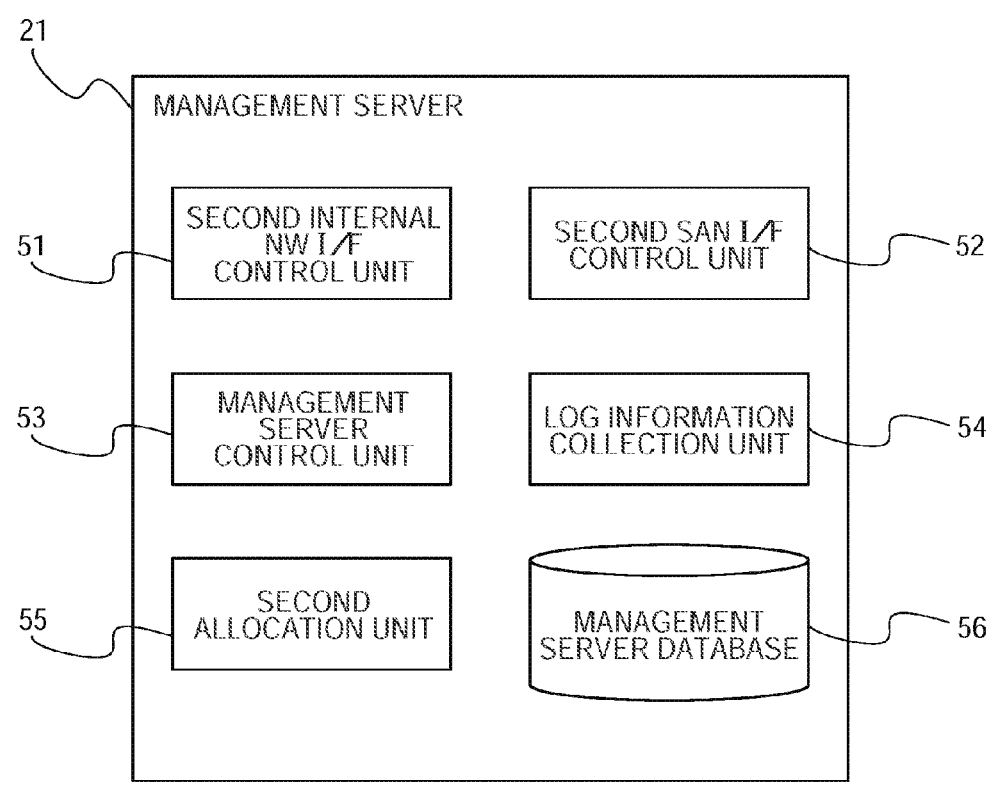
FIG. 5 is a diagram illustrating an example of a management server.

Next, an example of the management server 21 installed in the management center 3 will be described with reference to FIG. 5. The management server 21 includes a second internal network interface control unit 51, a second SAN interface control unit 52, a management server control unit 53, a log information collection unit 54, a second allocation unit 55, and a management server database 56.

The second internal network interface control unit 51 controls an interface coupled to the second internal network 24. The second SAN interface control unit 52 controls an interface for transmitting log information to the second storage device 23 through the second SAN 25.

The management server control unit 53 performs a variety of controls. In a case where the second storage device 23 is installed in the management center 3, the management server control unit 53 performs control of establishing an access channel between the second storage device 23 and the management server 21.

In a case where the second storage device 23 is not installed in the management center 3, the gateway server 16 is installed in the data center 2. The management server 21 is capable of accessing the gateway server 16 through the external network 4.

As described above, the monitor server control unit 45 performs control of establishing an access channel between the first storage device 13 and the gateway server 16. The management server 21 is accessibly coupled to the gateway server 16.

Accordingly, the monitor server 12 and the management server 21 are accessibly coupled to each other. In addition, an access channel is established between the first storage device 13 and the gateway server 16, and thus an access channel is established between the management server 21 and the first storage device 13.

The log information collection unit 54 collects log information. The log information collection unit 54 is an example of a collection unit. In a case where the second storage device 23 is installed in the management center 3, the log information collection unit 54 collects log information from the second storage device 23.

In a case where the second storage device 23 is not installed in the management center 3, the log information collection unit 54 collects log information from the first storage device 13 by using the access channel established between the management server 21 and the first storage device 13.

According to the embodiment, log information stored in a logical volume allocated to a business server 11 in which a failure is detected, among the logical volumes of the first storage device 13, is copied to a certain logical volume of the second storage device 23.

The second allocation unit 55 allocates the logical volume of the second storage device 23, to which the log information has been copied, as a logical volume of the management server 21. Thereby, the log information collection unit 54 collects log information from this logical volume of the second storage device 23 through the second SAN 25.

The management server database 56 stores therein a management server table. Information stored in the management server table is used when the management server control unit 53, the second allocation unit 55, and the like perform a variety of controls.

Next, the first storage device 13 installed in the data center 2 will be described with reference to FIG. 6. The first storage device 13 includes an inter-storage communication channel interface control unit 61, an internal network interface control unit 62, a mirror storage unit 63, a storage port control unit 64, and a copy unit 65.

The inter-storage communication channel interface control unit 61 controls an interface coupled to the inter-storage communication channel 5. The internal network interface control unit 62 controls an interface coupled to the first internal network 14.

The mirror storage unit 63 stores therein log information mirrored from the business servers 11. For example, the mirror storage unit 63 may be a virtual storage device consisting of a plurality of storage devices. The mirror storage unit 63 is divided into a plurality of logical volumes.

Figure 6:
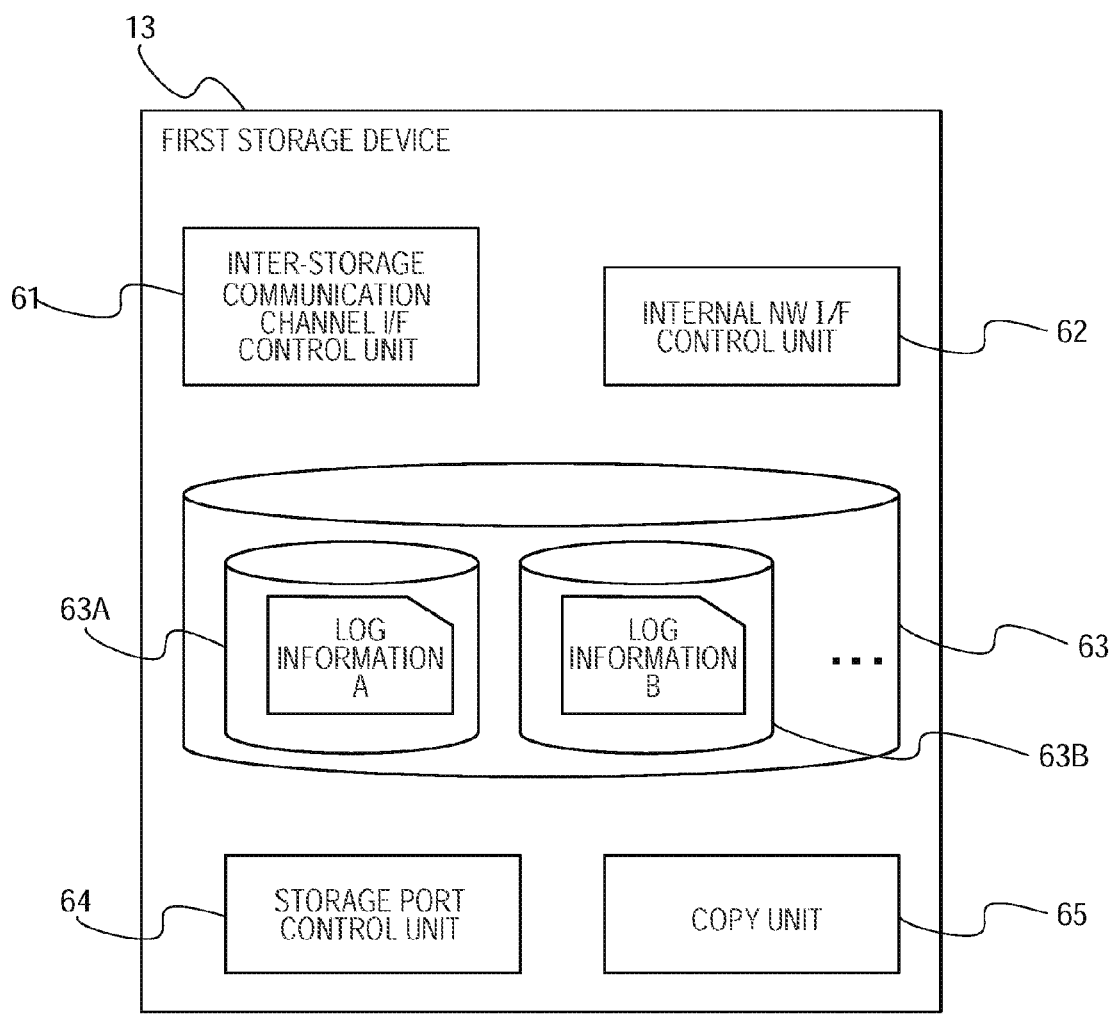
FIG. 6 is a diagram illustrating an example of a first storage device.

The example of FIG. 6 illustrates a logical volume 63A and a logical volume 63B among the plurality of logical volumes into which the mirror storage unit 63 is divided. The mirror storage unit 63 may be divided into one or a plurality of logical volumes in addition to the logical volume 63A and the logical volume 63B.

In the example of FIG. 6, log information A is stored in the logical volume 63A. The log information A is log information regarding a business server 11. A plurality of pieces of log information may be stored in the logical volume 63A insofar as that is log information regarding the same business server 11.

Similarly, log information B is stored in the logical volume 63B. The log information B is log information regarding a business server 11 different from the business server 11 corresponding to the log information A. A plurality of pieces of log information may be stored in the logical volume 63B insofar as that is log information regarding the same business server 11.

The storage port control unit 64 controls a storage port provided in a storage device. The copy unit 65 copies pieces of log information of the logical volumes stored in the mirror storage unit 63 to the second storage device 23. In other words, the copy unit 65 performs the remote mirror.

Figure 7:
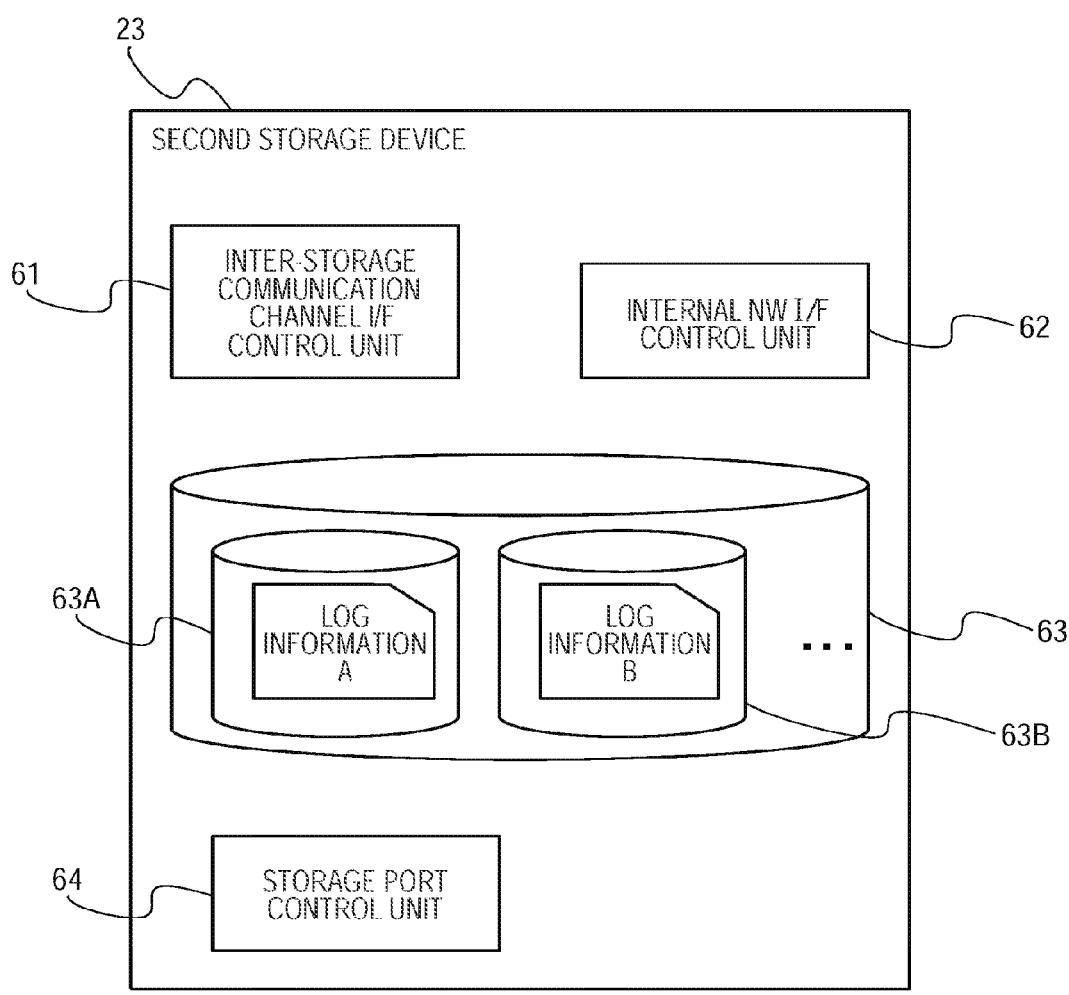
FIG. 7 is a diagram illustrating an example of a second storage device.

Next, an example of the second storage device 23 will be described with reference to FIG. 7. The second storage device 23 is substantially the same as the first storage device 13 illustrated in the example of FIG. 6. However, the second storage device 23 does not include the copy unit 65. This is because log information is not copied from the second storage device 23 to the first storage device 13.

Next, examples of a monitor server table and a management server table will be described with reference to FIGS. 8A and 8B. FIG. 8A is a diagram illustrating an example of a monitor server table. The monitor server table is a table which is stored in the monitor server database 47.

The monitor server table includes items of "failure ID", "IP address of business server", "IP address of storage device", "LVID", and "mount point in gateway server". The ID is short for identifier. The IP is short for an internet protocol.

The "failure ID" is an identifier for identifying a failure occurred in the business server 11. The "IP address of business server" is an IP address of the business server 11. The "IP address of storage device" is an IP address of the first storage device 13.

The "LVID" is an identifier for identifying a logical volume (LV) of the first storage device 13. Since one logical volume is allocated to each of the business servers 11, the "IP address of business server" and the "LVID" are associated with each other on a one-to-one basis.

The "mount point in gateway server" indicates a mount point of a logical volume of the first storage device 13 in the gateway server 16. In the "mount point in gateway server", "None" indicates that a logical volume corresponding to the LVID is not mounted in the gateway server 16.

A logical volume for which the "mount point in gateway server" is "None" is not recognized from the gateway server 16. A logical volume for which the "mount point in gateway server" is not "None" is recognized from the gateway server 16.

In the example of FIG. 8A, the "IP address of storage device" indicates the first storage device 13, and thus all of the IP addresses are the same IP address. However, a plurality of first storage devices 13 may be installed in the data center 2. In this case, the "IP address of storage device" may have different IP addresses.

A plurality of failure IDs may be associated with the same IP address of a business server 11. For example, in a case where it is detected that a plurality of failures have occurred in the business server 11, a plurality of failure IDs are associated with the same IP address of a business server.

Next, a management server table will be described. FIG. 8B is a diagram illustrating an example of a management server table. The management server table is a table stored in the management server database 56. The management server table includes items of "failure ID", "IP address of storage device", "LVID", and "mount point in management server".

The same ID as the "failure ID" in the monitor server table is allocated to the "failure ID" in the management server table. The "IP address of storage device" is an IP address of the second storage device 23.

The "LVID" is an identifier for identifying a logical volume (LV) of the second storage device 23. The "mount point in management server" indicates a mount point of a logical volume of the second storage device 23 in the management server 21.

The management server table is used in a case of method_A. The failure ID in the management server table is associated with an IP address of the second storage device 23, and the management server table is used in a case where the second storage device 23 is installed in the management center 3.

Accordingly, in a case where a record corresponding to a failure ID is not present in the management server table, the second storage device 23 is not installed in the management center 3. For example, in a case of the example of FIG. 8B, records corresponding to failure IDs of "2" and "3" are not present in the management server table.

Next, comparative examples of the amount of information in a case where log information is updated will be described with reference to FIGS. 9A and 9B. FIGS. 9A and 9B illustrate examples of log information having a file format (hereinafter, referred to as a log information file).

A file header is supplementary information which is added to a log information file. For example, the file header includes items of "file name", "file size", "owner", "access right", "creation date", and "update date".

In the log information file, data is the substance of log information. Updated data is information (data) corresponding to the updated portion in the log information file.

For example, a case where logical volumes of the first storage device 13 are not allocated to log information regarding business servers 11 is assumed. In this case, for example, the log information regarding a business server 11 is transmitted to the management center 3 through the external network 4 by a log server installed in the data center 2.

In this case, the log server transmits log information to the management center 3 in a file format. Accordingly, as illustrated in the example of FIG. 9A, all of the pieces of data (shaded portions) of the log information file are transmitted from the data center 2 to the management center 3.

When log information regarding the business servers 11 are frequently updated, the business server 11 performs control of generating a log information file whenever the log information is updated and transmitting the generated file to the management center 3, and thus a load on the business server 11 is increased.

In addition, when log information is frequently updated, the business servers 11 frequently transmits the log information to the management center 3, and thus a network load on the external network 4 is also increased. A network load on the external network 4 is further increased in association with an increase in the number of business servers 11 installed in the data center 2.

According to the embodiment, the business server 11 performs control of mirroring log information to the first storage device 13 under the control of the monitor server 12. In a case where the business server 11 updates log information, the business server 11 updates log information stored in a logical volume allocated to the business server 11 in the first storage device 13.

The business server 11 transmits information corresponding to the updated portion of the log information to the first storage device 13 through the first SAN 15. The first storage device 13 updates log information stored in a logical volume allocated to the business server 11 which is a transmission source of the received information, on the basis of the received information.

Accordingly, the business server 11 transmits information corresponding to the updated portion of the log information to the first SAN 15. In this case, as illustrated in the example of FIG. 9B, an amount of information (data) transmitted is small as compared to the example of FIG. 9A.

As described above, a business server 11 may handle a logical volume allocated to the business server 11 in the first storage device 13 in a similar manner as an auxiliary storage device built in the business server 11.

For this reason, the business server 11 may update log information stored in the logical volume of the first storage device 13 with a substantially equal load for updating log information stored in the storage unit 35.

Here, in a case where log information is transmitted in a file format, it is also considered that the business server 11 transmits only updated information to the management center 3. In this case, the business server 11 monitors whether or not the log information has been updated.

In addition, in a case where log information is updated, the business server 11 compares pieces of log information before and after updating with each other to thereby identify the updated information. Accordingly, the load of the business server 11 is increased by the process of monitoring and identifying updated information.

On the other hand, in a case where log information is updated, the business server 11 according to the embodiment only has to update log information stored in a logical volume of the first storage device 13, and thus it is possible to reduce the load of the business server 11.

Next, with reference to an example of a sequence chart of FIG. 10, a description will be given of a process in a case where a business server 11 which is not set as a to-be-monitored server, which is a business server 11 to be monitored by the monitor server 12, is newly set as a to-be-monitored server. Hereinafter, this process will be referred to as a process of adding a to-be-monitored server.

For example, in a case where a new business server 11 is installed in the data center 2 and the new business server 11 is set to be monitored by the monitor server 12, the process of adding a to-be-monitored server is performed. In addition, in a case where an existing business server 11 installed in the data center 2 is newly set to be monitored, the process of adding a to-be-monitored server may be performed.

For example, an operator who operates the monitor server 12 inputs predetermined information (setting information r) for adding a server (business server 11) to the monitor server 12. The monitor server 12 receives the input of the setting information for adding a server (S1).

The setting information for adding a server includes, for example, information for making the monitor server 12 access the business server 11 (a user name, a password, an IP address of a business server 11, and the like), an IP address of an interface coupled to the first SAN 15, and the like. In addition, the setting information for adding a server also includes information such as an IP address of the first storage device 13 to which log information regarding the business server 11 is copied.

The monitor server control unit 45 of the monitor server 12 instructs the first storage device 13 to allocate a logical volume which is not allocated to any business server 11, among logical volumes of the first storage device 13 (S2).

Upon receiving the instruction from the monitor server 12, the first storage device 13 creates a logical volume to be allocated to the business server 11 and an access channel between the business server 11 and the first storage device 13. The access channel is an access channel of the first SAN 15.

The first storage device 13 returns an ID (LVID) of the logical volume which is allocated to the business server 11 to the monitor server 12 together with information regarding the access channel of the first SAN 15 (S3). The first storage device 13 assigns a unique ID to a logical volume.

The monitor server control unit 45 sets various pieces of information in the monitor server table (S4). For example, the monitor server control unit 45 sets the IP address of the business server 11 for which the input is received in 51 and the IP address of the first storage device 13 in the monitor server table.

In addition, the monitor server control unit 45 sets the LVID, which is returned from the first storage device 13 in S3, in the monitor server table. Thereby, the monitor server table is updated (S5).

The monitor server control unit 45 instructs the first SAN 15 to stablish an access channel of the first SAN 15 on the basis of information regarding the access channel, which is received from the first storage device 13 (S6).

The first SAN 15 includes a plurality of communication channels and includes switches (for example, fiber channel switches or the like) for switching the communication channels. Each of the switches of the first SAN 15 performs setting for establishing an access channel between the business server 11 and the first storage device 13 in accordance with the instruction given from the monitor server 12.

Thereby, an access channel of the first SAN 15 is established for coupling the business server 11 and the first storage device 13 to each other (S7).

After the access channel of the first SAN 15 is established, the monitor server control unit 45 instructs the first storage device 13 to mount and format the logical volume allocated to the business server 11 in the first storage device 13 (S8).

The first storage device 13 performs the mounting and formatting of the logical volume (S9). The logical volume is mounted, and thus the business server 11 recognizes the logical volume.

In addition, the first storage device 13 performs formatting (for example, formatting in a file system) of the mounted logical volume, and thus the logical volume is initialized.

The monitor server control unit 45 instructs the business server 11 to set the mirror control unit 34 (S10). As described above, the function of the mirror control unit 34 may be realized by a mirror program.

In this case, the monitor server control unit 45 transmits an installation program for installing the mirror program to the business server 11.

The business server 11 executes the installation program, and thus the mirror program is installed in the business server 11. Thereby, the mirror control unit 34 is set in the business server 11 (S11).

When the mirror control unit 34 is set in the business server 11, the mirror control unit 34 functions. Thereby, when the business server 11 performs addition of new log information or update of log information on the storage unit 35, the business server 11 also performs the addition of new log information or the update of log information on the logical volume of the first storage device 13.

Thereby, a copy of log information stored in the storage unit 35 is stored into a logical volume allocated to the business server 11 in the first storage device 13. In other words, mirroring is performed.

When the monitor server control unit 45 causes the business server 11 to set the mirror control unit 34, the monitor server control unit 45 may designate log information to be monitored (to be collected). For example, some of a plurality of pieces of log information regarding the business server 11 may be collected.

In this case, the designated log information may be stored in the storage unit 35, and a copy thereof may be stored in the logical volume allocated to the business server 11 in the first storage device 13. Information regarding the designation of log information may be included in, for example, the installation program.

The business server 11 executes the installation program, and thus the designation of a to-be-collected log, which is log information to be collected, is set in the mirror control unit 34 which is set in the business server 11.

Figure 11:
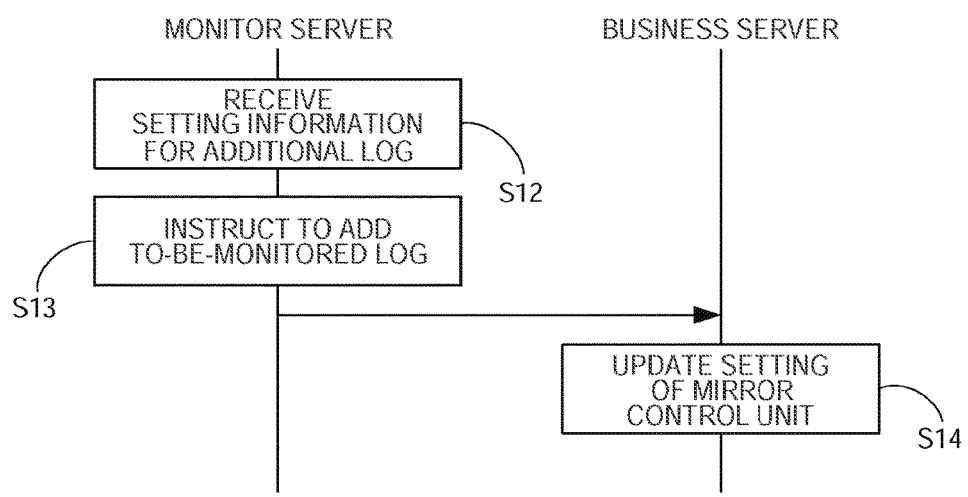
FIG. 11 is a sequence chart illustrating an example of a process of adding a to-be-monitored log.

Next, a description will be given of a process of newly adding a to-be-monitored log, which is log information to be monitored, to the business server 11 will be described with reference to an example of a sequence chart of FIG. 11. Hereinafter, this process will be referred to as a process of adding a to-be-monitored log.

For example, an operator who operates the monitor server 12 inputs, to the monitor server 12, information (setting information for additional log) regarding the to-be-monitored log to be added. The monitor server 12 receives the input of setting information for additional log (S12).

The setting information for additional log includes, for example, information (a user name, a password, an IP address of the business server 11, and the like) for making the monitor server 12 access the business server 11, information regarding log information added as a to-be-monitored log, and the like.

The monitor server control unit 45 instructs the business server 11 to add the to-be-monitored log, on the basis of the setting information for additional log (S13). The mirror control unit 34 of the business server 11 updates, in response to the instruction, the setting so as to add the to-be-monitored log (S14).

Thereby, the mirror control unit 34 copies the added to-be-monitored log to a logical volume of the first storage device 13 on the basis of the updated setting. In a case where the mirror control unit 34 is realized by the execution of a mirror program, the mirror program is executed again, and thus the update of setting may be reflected on the mirror control unit 34.

The monitor server control unit 45 may transmit a program (log information addition program) for adding a to-be-monitored log to the business server 11. The log information addition program includes information regarding the to-be-monitored log to be added.

The business server 11 executes the log information addition program to thereby perform setting of adding the to-be-monitored log on the mirror control unit 34.

Figure 12:
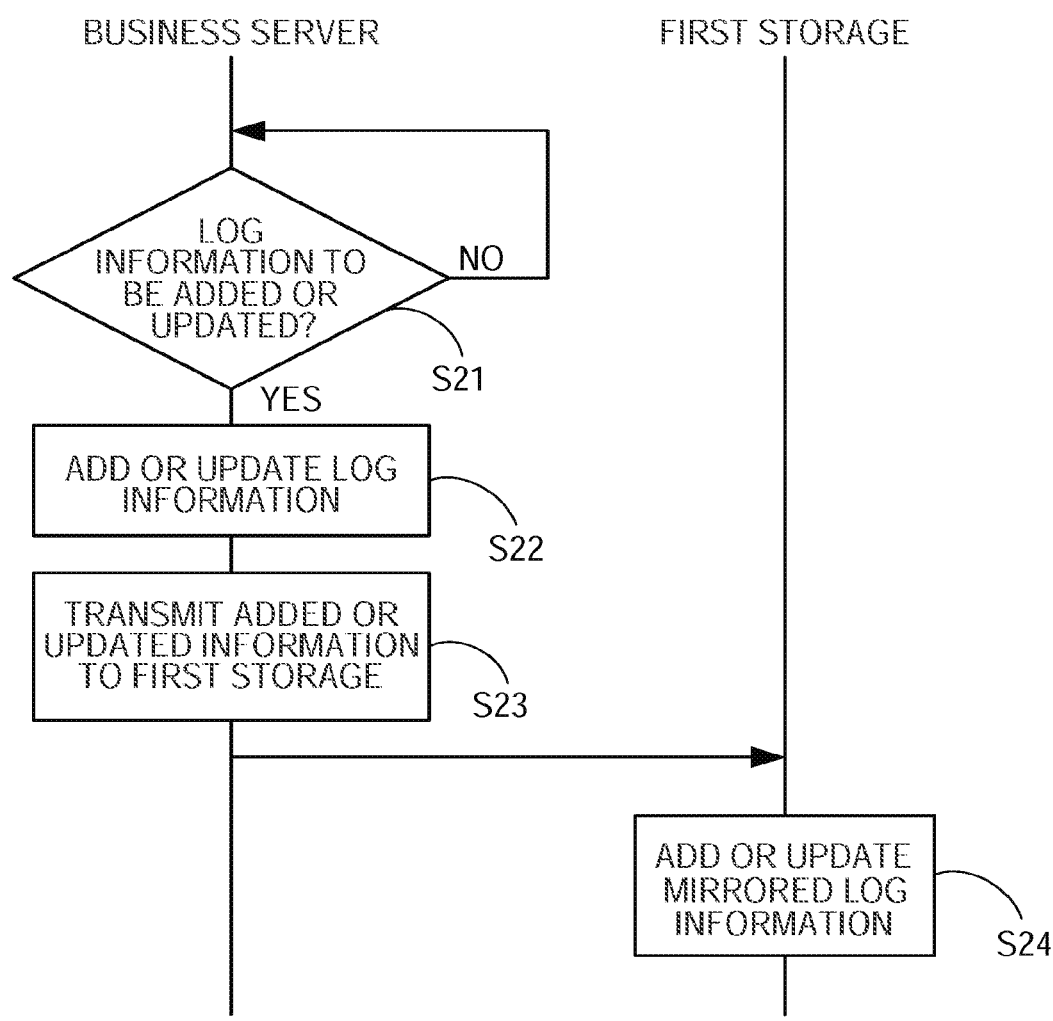
FIG. 12 is a sequence chart illustrating an example of a mirror process.

Next, a mirror process will be described with reference to an example of a sequence chart of FIG. 12. The business server control unit 33 determines whether to add or update log information (S21).

For example, in a case where the business server 11 takes on a role in operating a new business system, to-be-monitored logs are added. In addition, to-be-monitored logs may be newly added, in such a case where a business system operated by the business server 11 is updated.

In a case where log information is neither added nor updated (NO in S21), S21 is repeated until the addition or update thereof is performed. In a case where log information is added or updated (YES in S21), the business server control unit 33 stores, in the storage unit 35, the log information to be added, or updates log information already stored in the storage unit 35 (S22).

Along with the process of S22, the mirror control unit 34 transmits the added log information or updated information to the first storage device 13 through an established access channel of the first SAN 15 (S23).

The first storage device 13 stores the added log information in a logical volume allocated to the business server 11 or updates log information already stored in the logical volume (S24).

As described above, identical contents to contents of log information stored in the storage unit 35 of the business server 11 are reflected on a logical volume allocated to the business server 11 in the first storage device 13. In other words, mirroring is performed.

Figure 13:
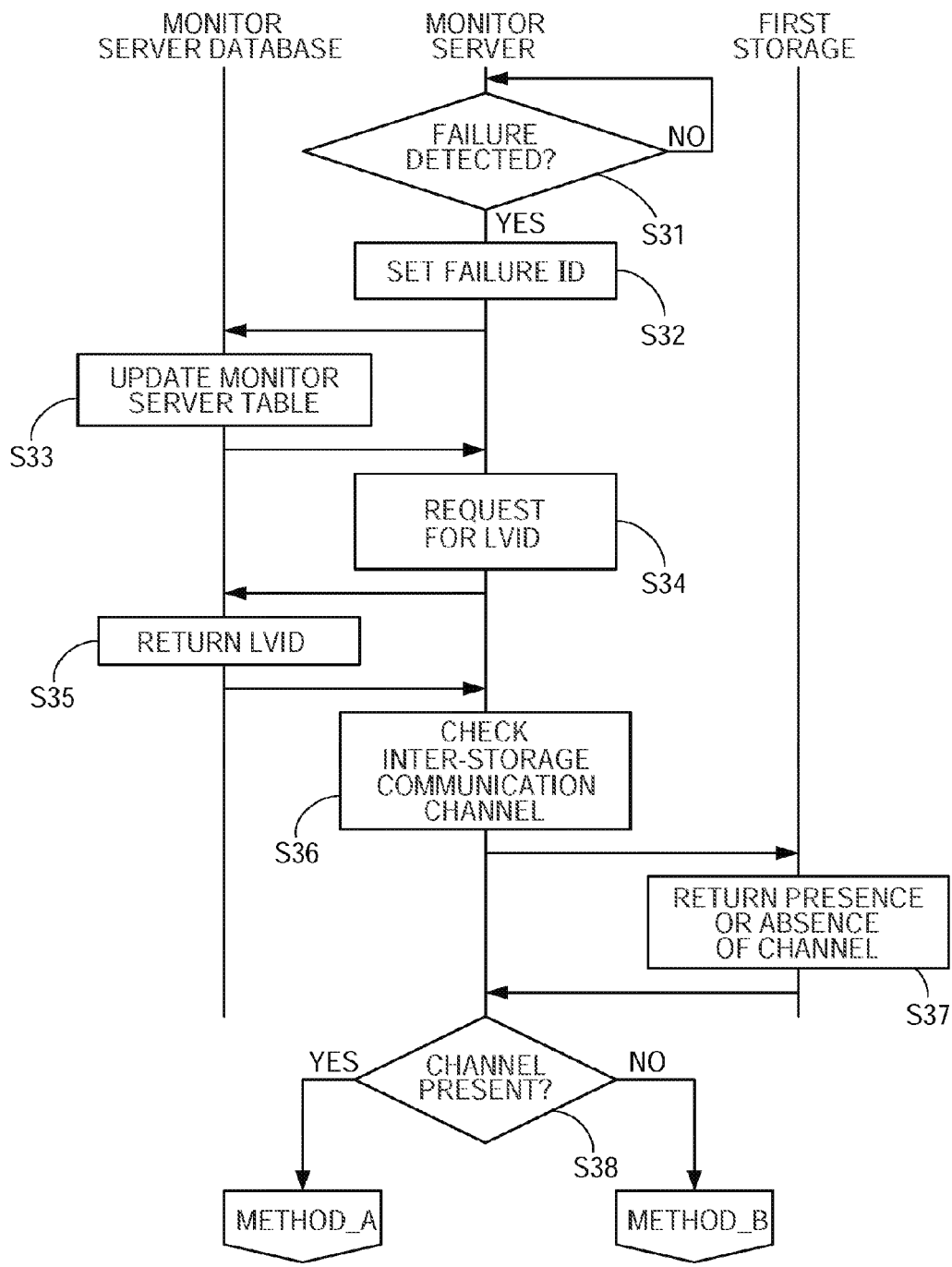
FIG. 13 is a sequence chart illustrating an example of a process of collecting log information.

Next, an example of a process of collecting log information will be described with reference to an example of a sequence chart of FIG. 13. According to the embodiment, log information is collected in a case where the failure detection unit 44 of the monitor server 12 detects that a failure has occurred in any of the business servers 11 to be monitored.

In a case where the failure detection unit 44 does not detect that a failure has occurred in any of the to-be-monitored servers installed in the data center 2 (NO in S31), S31 is repeated until the failure detection unit 44 detects a failure.

In a case where the failure detection unit 44 has detected an occurrence of a failure (YES in S31), the monitor server control unit 45 newly issues a failure ID and sets the issued failure ID in a monitor server table (S32).

The new failure ID is set in a record of the monitor server table, which corresponds to an IP address of a business server 11 in which the occurrence of a failure is detected. Thereby, the monitor server table is updated (S33).

The monitor server control unit 45 request the monitor server database 47 for an LVID corresponding to the failure ID which is set in the monitor server table stored in the monitor server database 47 (S34). The monitor server database 47 returns the LVID (S35).

The channel detection unit 43 checks whether or not the inter-storage communication channel 5 is coupled to the first storage device 13 (S36). To perform this, the channel detection unit 43 accesses the first storage device 13 through the first internal network 14 to thereby check the presence or absence of the inter-storage communication channel 5.

The first storage device 13 returns, to the monitor server 12, whether or not the inter-storage communication channel 5 is coupled to the first storage device (S37).

In a case where the inter-storage communication channel 5 is coupled to the first storage device 13 (YES in S38), the process proceeds to method_A. In a case where the inter-storage communication channel 5 is not coupled to the first storage device 13 (NO in S38), the process proceeds to method_B.

The process of method_A and the process of method_B are performed in a case where a determination result in S31 is YES. Accordingly, the subsequent processes of method_A and method_B are performed in a case where it is detected that a failure has occurred in the business server 11.

Figure 14:
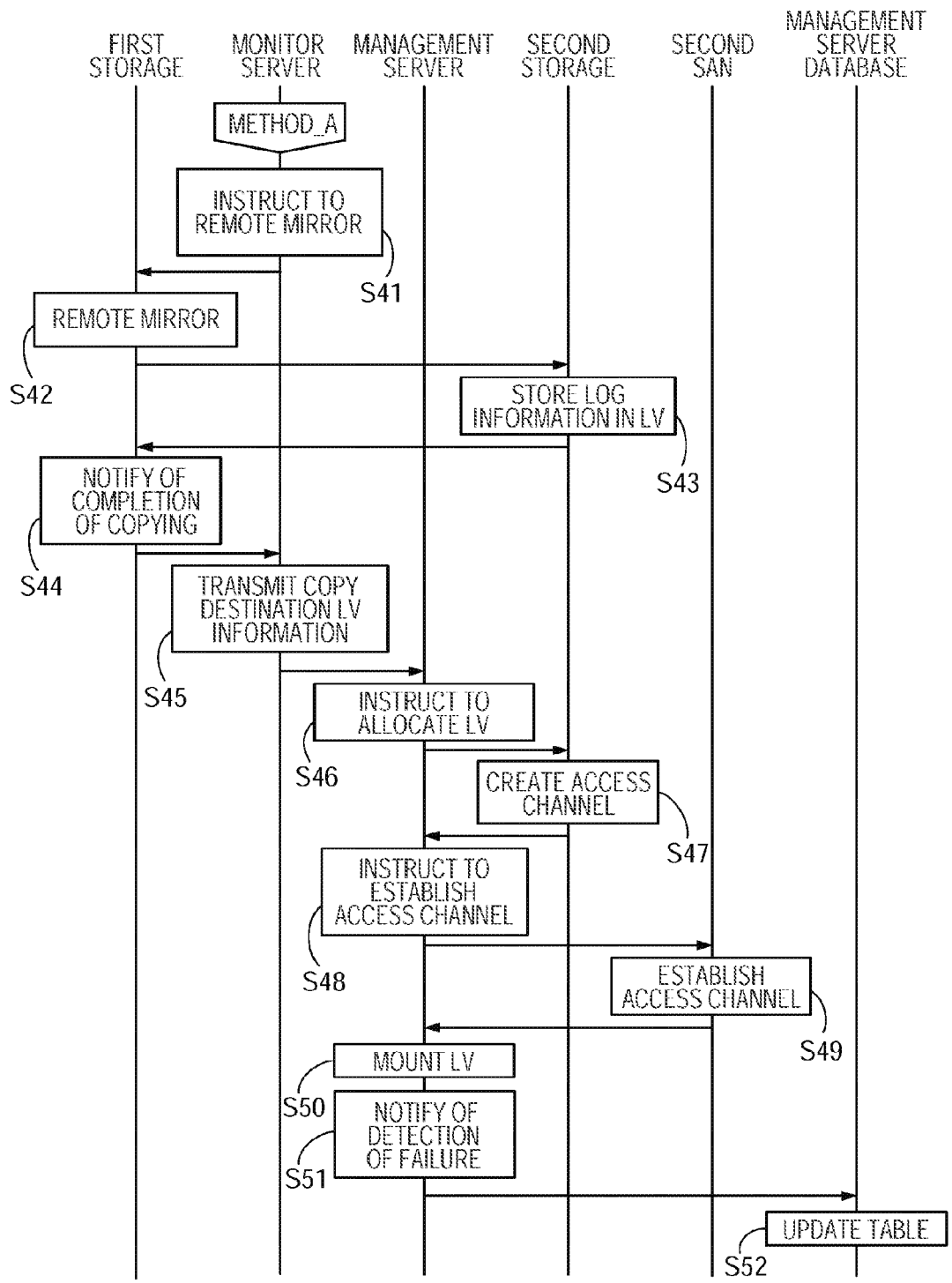
FIG. 14 is a sequence chart illustrating an example of a process of collecting log information.

A process in the case of method_A will be described with reference to an example of a sequence chart of FIG. 14. In a case where the occurrence of a failure is detected, the monitor server control unit 45 instructs, through the first internal network 14, the first storage device 13 to copy log information stored in each logical volume to the second storage device 23 (S41). This copy is remote mirror.

The copy unit 65 of the first storage device 13 copies log information of each logical volume to the second storage device 23 through the inter-storage communication channel 5 on the basis of the instruction (S42).

The mirror storage unit 63 of the second storage device 23 is divided into a plurality of logical volumes. Log information stored in a logical volume allocated to a business server 11 in the first storage device 13, of which log information is to be collected, is stored in a logical volume in the second storage device 23 (S43).

Upon completing the copy, the first storage device 13 notifies the monitor server 12 of the completion of copying (S44). The notice of the completion of copying includes information (hereinafter, referred to as copy destination LV information) indicating to which logical volume in the second storage device 23 each logical volume of the first storage device 13 is copied.

The monitor server control unit 45 transmits the copy destination LV information to the management server 21 (S45). The second allocation unit 55 of the management server 21 instructs the second storage device 23 to allocate a logical volume copied to the second storage device 23 as a logical volume of the management server 21 (S46).

The second storage device 23 creates an access channel between the management server 21 and the second storage device 23 (S47). This access channel is an access channel of the second SAN 25.

The management server control unit 53 instructs, on the basis of information regarding the created access channel of the second SAN 25, the second SAN 25 to establish an access channel of the second SAN 25 (S48). The second SAN 25 includes a plurality of communication channels, and includes switches (for example, fiber channel switches or the like) for switching the communication channels. Each of the switches of the second SAN 25 establishes an access channel between the management server 21 and the second storage device 23 in accordance with the instruction received from the management server control unit 53 (S49).

The management server control unit 53 mounts a logical volume allocated to the management server 21 in the second storage device 23 (S50). Thereby, the logical volume is recognized by the second storage device 23.

The management server control unit 53 notifies the manager terminal 22 of information indicating that the occurrence of a failure is detected, and log arrangement LV information (S51).

The log arrangement LV information is information (mount point) regarding a logical volume of the second storage device 23 in which log information is stored. For example, the management server control unit 53 may transmit the notice to the manager terminal 22 through an e-mail.

The management server control unit 53 updates the management server table by inserting a new record (S52). The newly inserted record includes information indicating a failure ID, an IP of the second storage device 23, an LVID, and a mount point in the management server 21.

Figure 15:
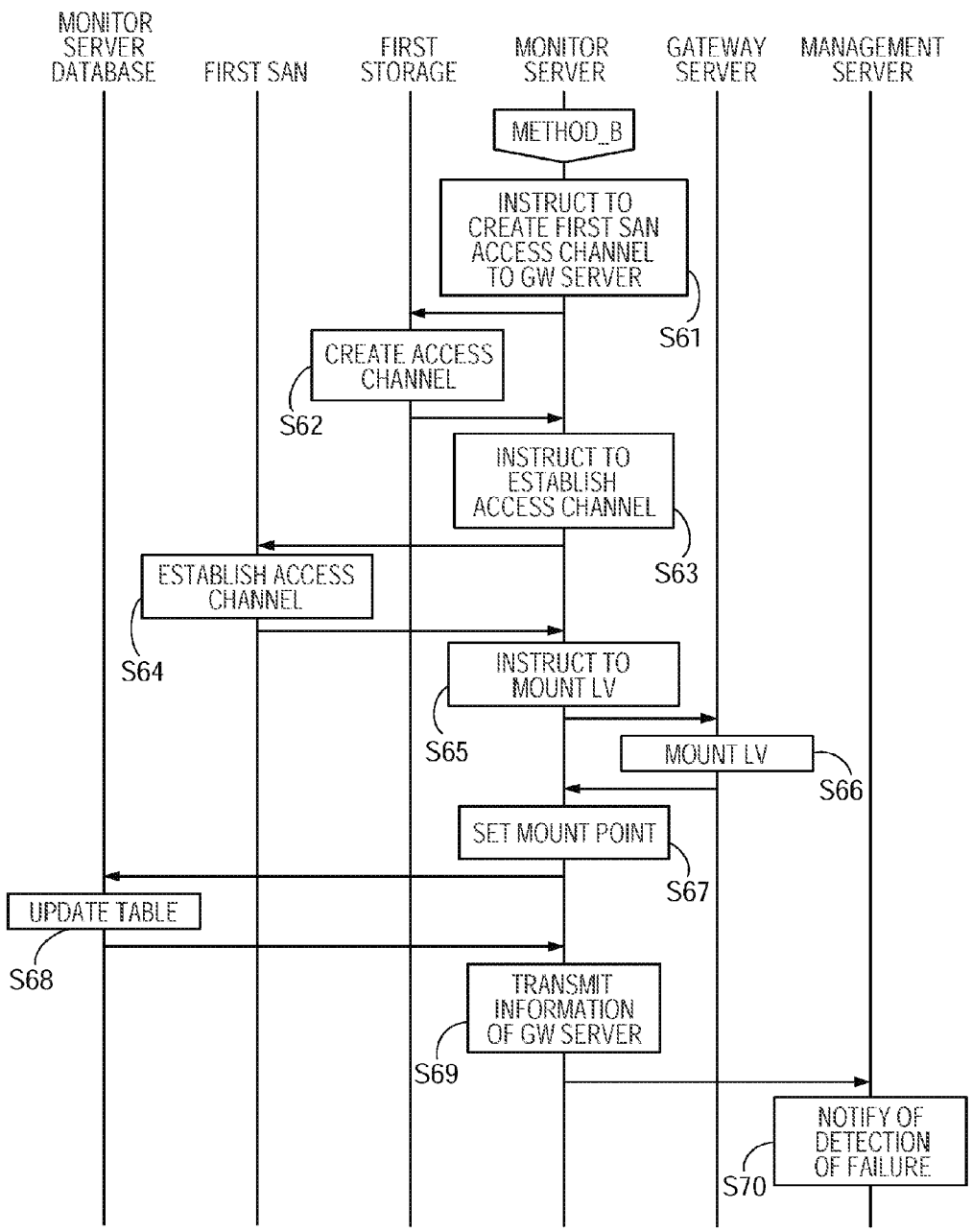
FIG. 15 is a sequence chart illustrating an example of a process of collecting log information.

Next, the process of method_B which is performed in a case where a determination result in S38 is NO will be described with reference to a sequence chart of FIG. 15.

The monitor server control unit 45 of the monitor server 12 checks information regarding the gateway server 16. The information regarding the gateway server 16 includes information (a user name, a password, an IP address, and the like) for an access to the gateway server 16. In addition, the information regarding the gateway server 16 also includes information such as an IP address of a port through which the gateway server 16 is coupled to the first SAN 15.

The monitor server control unit 45 instructs the first storage device 13 to create an access channel between the gateway server 16 and the first storage device 13 (S61). Hereinafter, this access channel may be referred to as a first SAN access channel to the gateway server 16. In addition, a gateway may be referred to as "GW" below.

The first storage device 13 creates an access channel between the gateway server 16 and the first storage device 13 in accordance with the instruction. (S62).

The monitor server control unit 45 instructs the first SAN 15 to establish the first SAN access channel to the gateway server 16 (S63). The first SAN 15 establishes the first SAN access channel to the gateway server 16 (S64).

The monitor server control unit 45 instructs the gateway server 16 to mount a target logical volume (target LV) which is the logical volume of the first storage device 13, which is allocated to the business server 11 in which the occurrence of a failure is detected (S65).

The gateway server 16 mounts the target logical volume in the first storage device 13 in accordance with the instruction received from the monitor server control unit 45 (S66). Thereby, the gateway server 16 recognizes the target logical volume.

The monitor server control unit 45 sets a mount point of the target logical volume mounted in S66 to "mount point in gateway server" in the monitor server table (S67). Thereby, the monitor server table is updated (S68).

The monitor server control unit 45 transmits information for an access to the gateway server 16 and information regarding the mount point of the target logical volume to the management server 21 (S69).

Thereby, an access channel from the management server 21 through the external network 4, the gateway server 16, and the first SAN 15 to the first storage device 13 is established.

The management server control unit 53 of the management server 21 notifies the manager terminal 22 of information indicating that the occurrence of a failure is detected, and the log arrangement LV information (S70).

As described above, in the case of method_A, an access channel between the management server 21 and the second storage device 23 is established through the second SAN 25. In addition, in the case of method_B, an access channel between the management server 21 and the first storage device 13 is established through the external network 4, the gateway server 16, and the first SAN 15.

Figure 16:
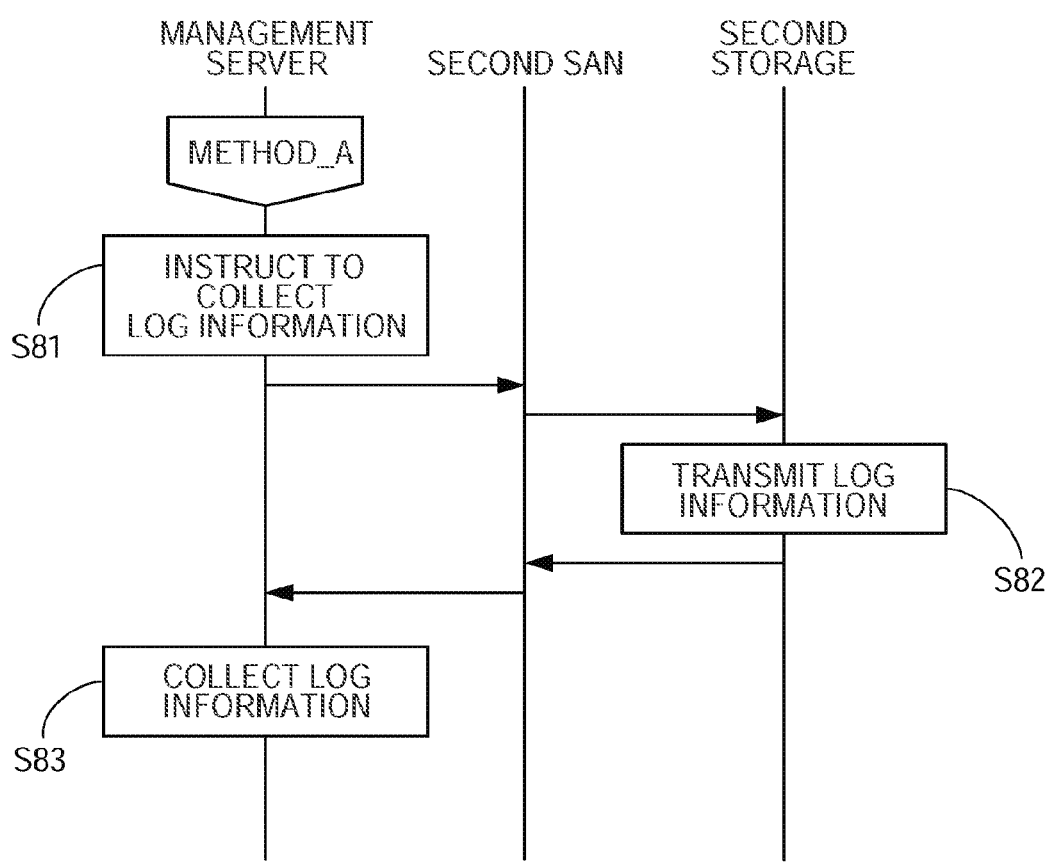
FIG. 16 is a sequence chart illustrating an example of a process of collecting log information.

Next, the collection of log information which is performed by the management server 21 will be described with reference to examples of sequence charts of FIGS. 16 and 17. FIG. 16 is a sequence chart in the case of method_A.

The log information collection unit 54 of the management server 21 instructs to collect log information (S81). In the case of method_A, an access channel between the management server 21 and the second storage device 23 is established through the second SAN 25. For this reason, the instruction for collecting log information is transmitted to the second storage device 23 through the access channel.

The instruction for collecting log information includes an LVID which corresponds to a failure ID of the management server table. The LVID corresponds to the business server 11 in which the occurrence of a failure is detected. The second storage device 23 acquires log information from a logical volume corresponding to the LVID, and transmits the acquired log information to the management server 21 (S82).

The log information is transmitted to the management server 21 through the access channel. Thereby, the log information collection unit 54 of the management server 21 collects log information (S83).

Figure 17:
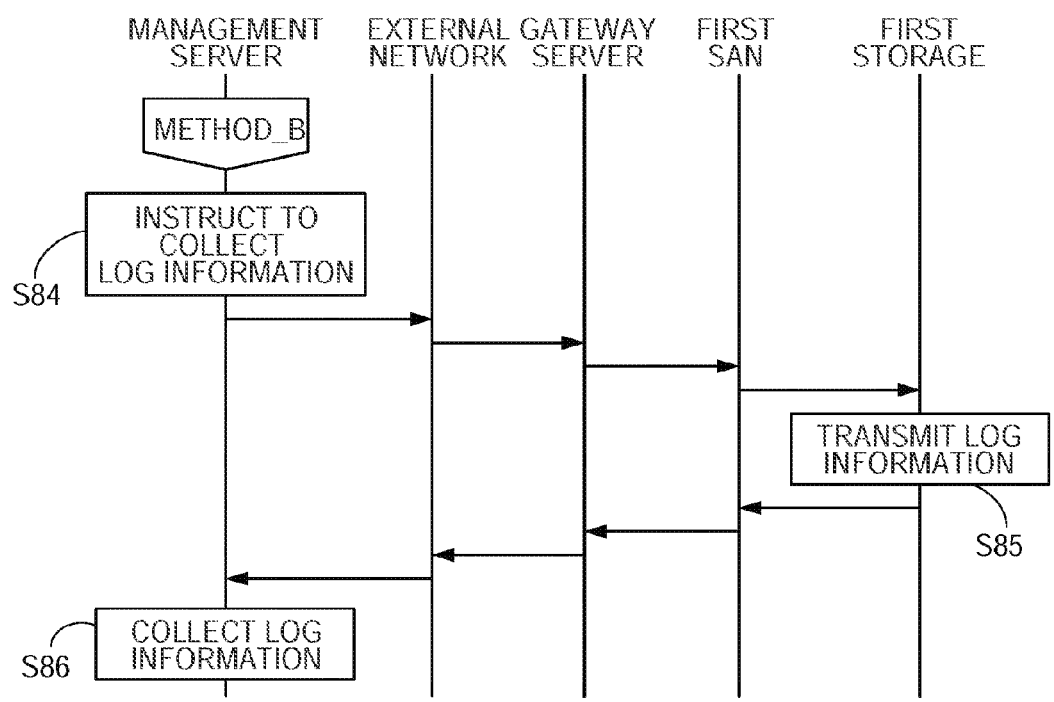
FIG. 17 is a sequence chart illustrating an example of a process of collecting log information.

FIG. 17 is a sequence chart in the case of method_B. In the case of method_B, an access channel between the management server 21 and the first storage device 13 is established through the external network 4, the gateway server 16, and the first SAN 15.

The log information collection unit 54 of the management server 21 instructs to collect log information (S84). This instruction (instruction for collecting log information) is transmitted to the first storage device 13 through the external network 4, the gateway server 16, and the first SAN 15.

The instruction for collecting log information includes a failure ID of the management server table. The gateway server 16 receives the instruction for collecting log information which is transmitted from the management server 21 through the external network 4.

The gateway server 16 acquires an LVID which corresponds to a failure ID from the monitor server table stored in the monitor server database 47 of the monitor server 12, and includes the LVID in the instruction for collecting log information.

The first storage device 13 acquires log information from the logical volume corresponding to the LVID, and transmits the acquired log information to the management server 21 (S85). The log information is transmitted to the management server 21 through the established access channel. Thereby, the log information collection unit 54 collects log information (S86).

Figure 18:
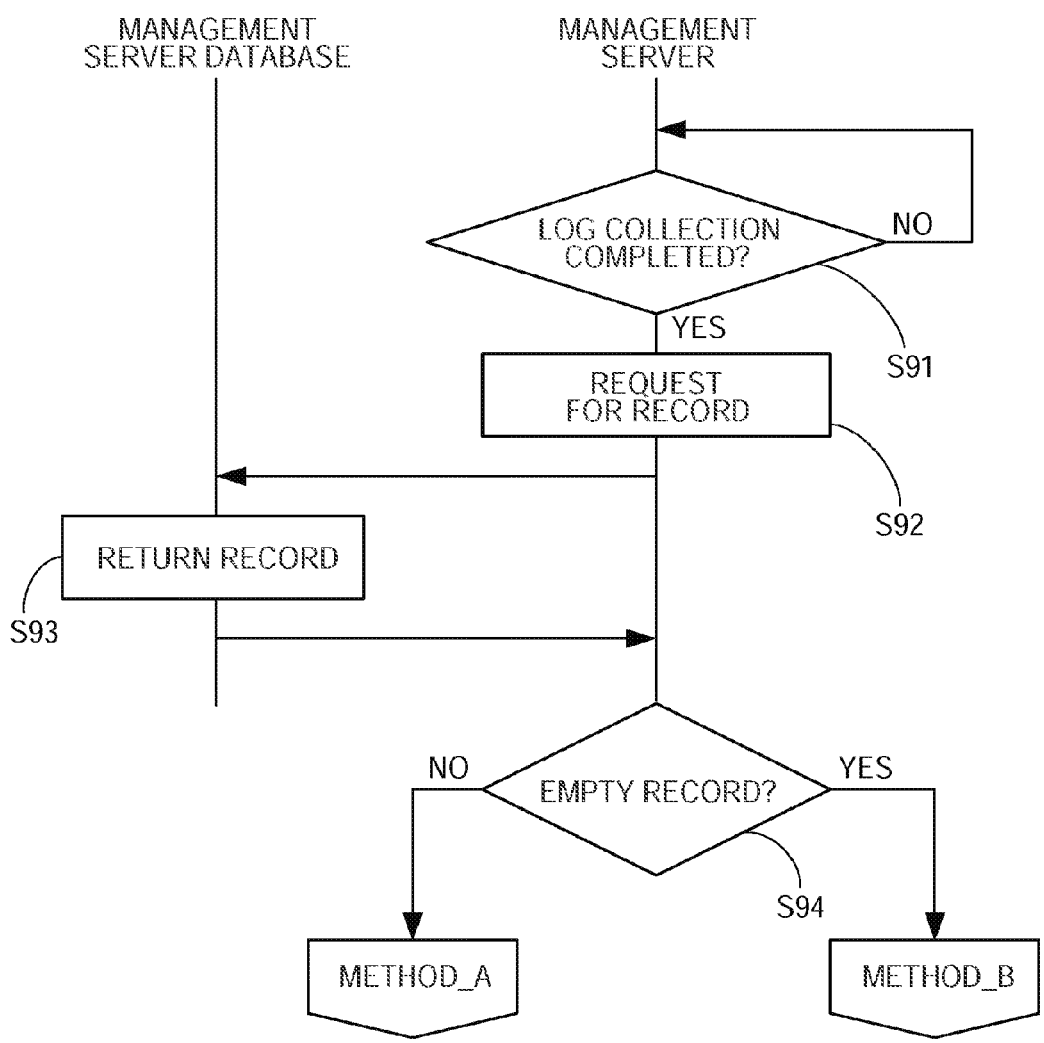
FIG. 18 is a sequence chart illustrating an example of a process after the collection of log information.
Figure 19:
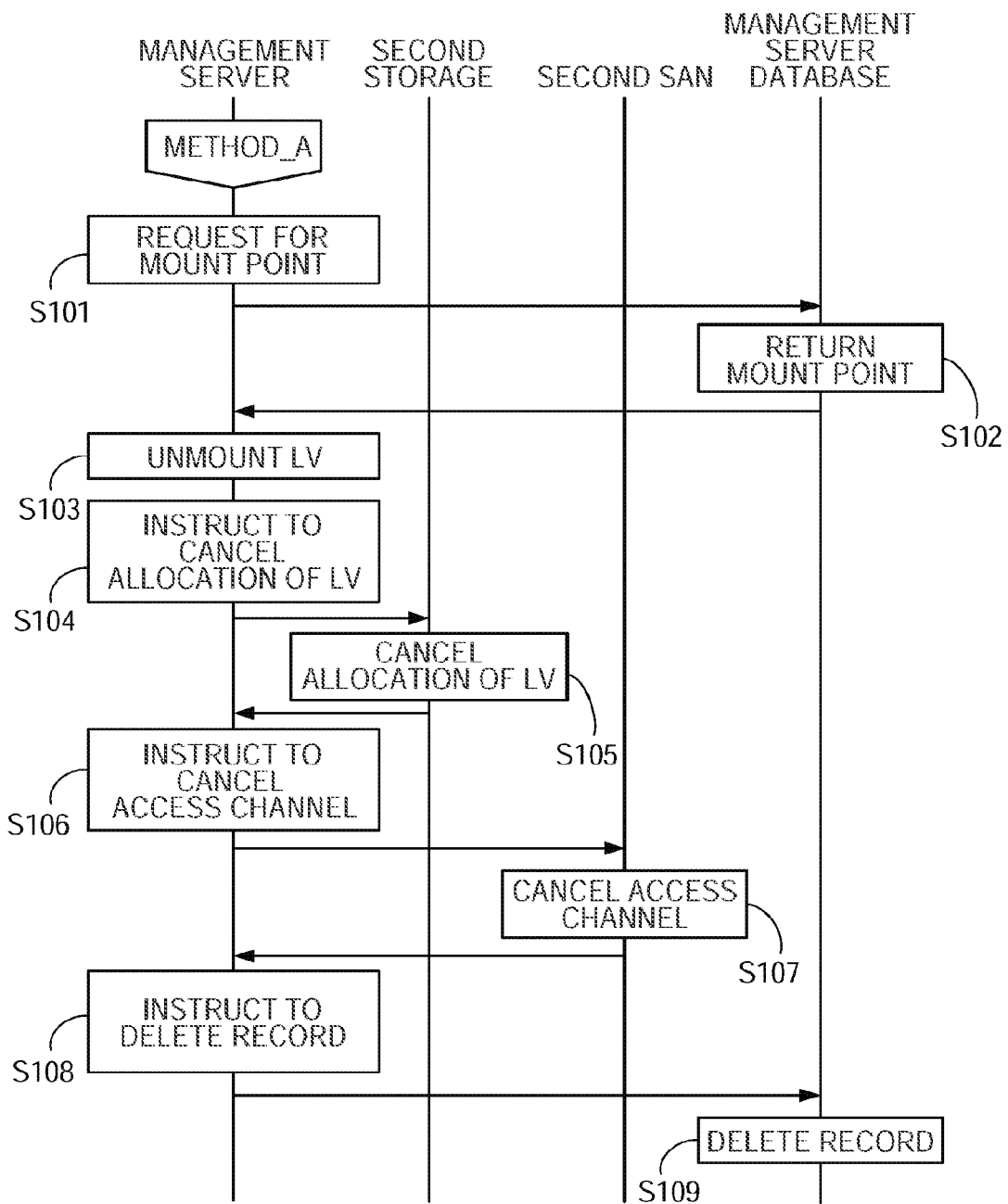
FIG. 19 is a sequence chart illustrating an example of a process after the collection of log information.
Figure 20:
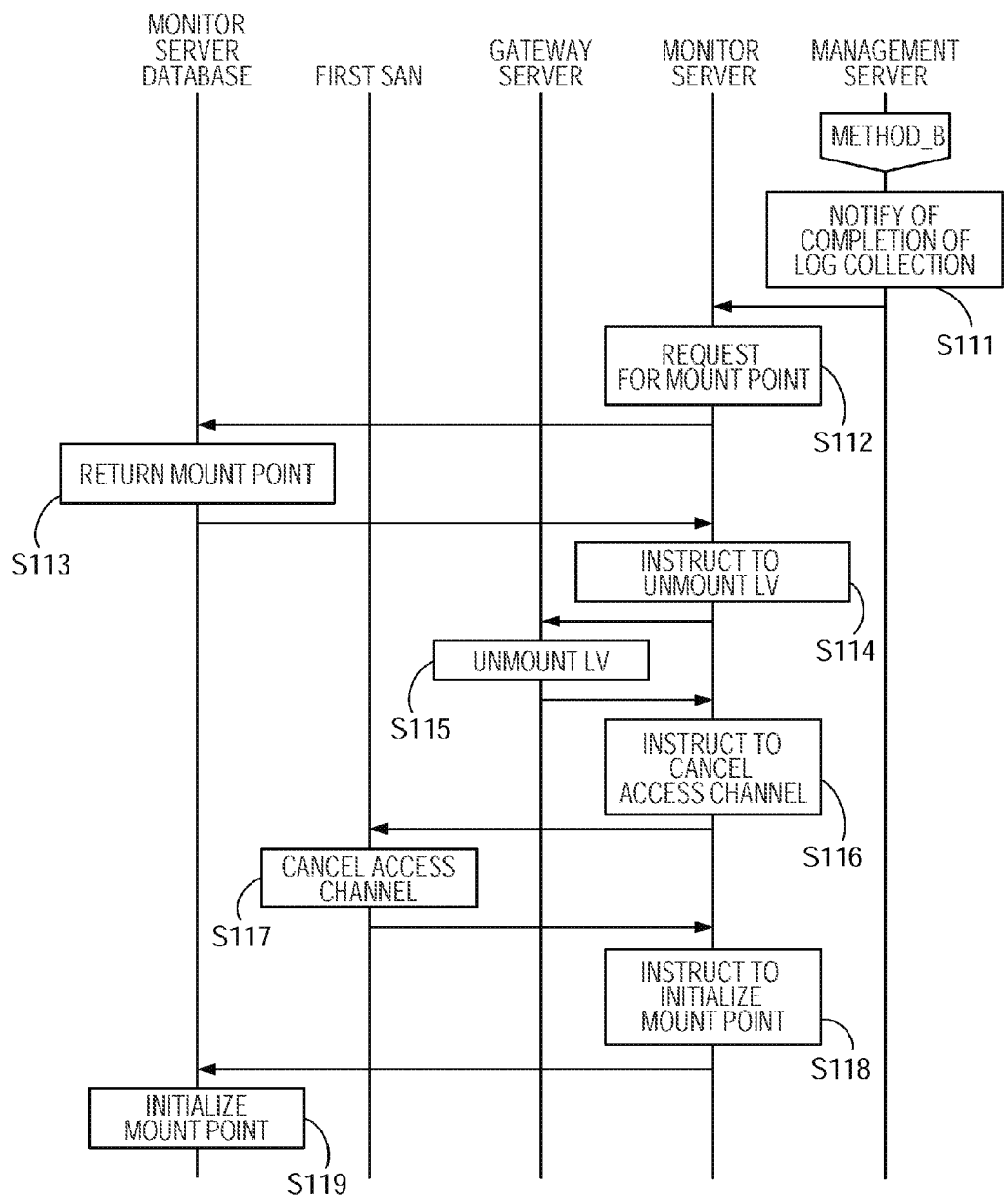
FIG. 20 is a sequence chart illustrating an example of a process after the collection of log information.

Next, a process after the collection of log information will be described with reference to examples of sequence charts of FIGS. 18 to 20. In a case where the log information collection unit 54 of the management server 21 has not completed the collection of log information (NO in S91), S91 is repeated until the collection of log information is completed.

In a case where the log information collection unit 54 of the management server 21 has completed the collection of log information (YES in S91), the allocation of a logical volume storing log information of which the collection has been completed is to be canceled.

As described above, the collection of log information is performed on the basis of a failure ID. The management server control unit 53 requests the management server database 56 to acquire a record of a failure ID corresponding to the log information of which the collection has been completed, from the management server table (S92).

When the failure ID is present in the management server table stored in the management server database 56, the management server database 56 returns a record corresponding to the failure ID to the management server control unit 53.

When the failure ID is not present in the management server table stored in the management server database 56, the management server database 56 returns an empty record to the management server control unit 53 (S93).

In a case where a record which is not empty is returned to the management server control unit 53, the second storage device 23 is installed in the management center 3 as described above. In this case (NO in S94), the process proceeds to method_A.

In a case where an empty record is returned to the management server control unit 53, the second storage device 23 is not installed in the management center 3 as described above. In this case (YES in S94), the process proceeds to method_B.

The process in the case of method_A will be described with reference to an example of a sequence chart of FIG. 19. The management server control unit 53 requests the management server database 56 to acquire a mount point ("mount point in management server") of a logical volume which corresponds to a failure ID from the management server table (S101).

The management server database 56 returns the mount point corresponding to the failure ID to the management server control unit 53 (S102). The management server control unit 53 unmounts the acquired mount point of the logical volume (S103). Thereby, the logical volume is not recognized by the management server 21.

The management server control unit 53 instructs the second storage device 23 to cancel the allocation of the logical volume (S104). This instruction includes an LVID which corresponds to the failure ID.

The second storage device 23 cancels the allocation of the logical volume corresponding to the LVID in accordance with the instruction (S105).

The management server control unit 53 instructs the second SAN 25 to cancel the established access channel of the second SAN 25 (S106). The second SAN 25 controls a switch or the like to thereby cancel the established access channel of the second SAN 25 in accordance with the instruction (S107).

The management server control unit 53 instructs the management server database 56 to delete the record of the management server table, which corresponds to the failure ID (S108). The management server database 56 deletes the record corresponding to the failure ID from the management server table.

As described above, the process after the collection of log information in the case of method_A is terminated. Next, a process after the collection of log information in the case of method_B will be described with reference to an example of a sequence chart of FIG. 20.

The management server control unit 53 transmits a notice (log information collection completion notice) indicating the completion of collection of log information to the monitor server 12 (S111). The log information collection completion notice includes a failure ID corresponding to log information of which the collection is completed.

The monitor server control unit 45 requests the monitor server database 47 to acquire a mount point ("mount point in gateway server") of a logical volume corresponding to the failure ID from the monitor server table (S112).

The monitor server database 47 returns the mount point (S113). The monitor server control unit 45 instructs the gateway server 16 to unmount the mount point of the logical volume (S114). The gateway server 16 unmounts the mount point in accordance with the instruction (S115).

The monitor server control unit 45 instructs the first SAN 15 to cancel the established access channel between the gateway server 16 and the first storage device 13 (S116). The first SAN 15 controls a switch or the like to thereby cancel the access channel in accordance with the instruction (S117).

The monitor server control unit 45 instructs to initialize a mount point of a record of the monitor server table, which corresponds to the failure ID (S118). The monitor server database 47 initializes "mount point in gateway server" of the record corresponding to the failure ID in the monitor server table (S119).

In the example of FIGS. 8A and 8B, the initialized "mount point in gateway server" is set to be "None".

Figure 21:
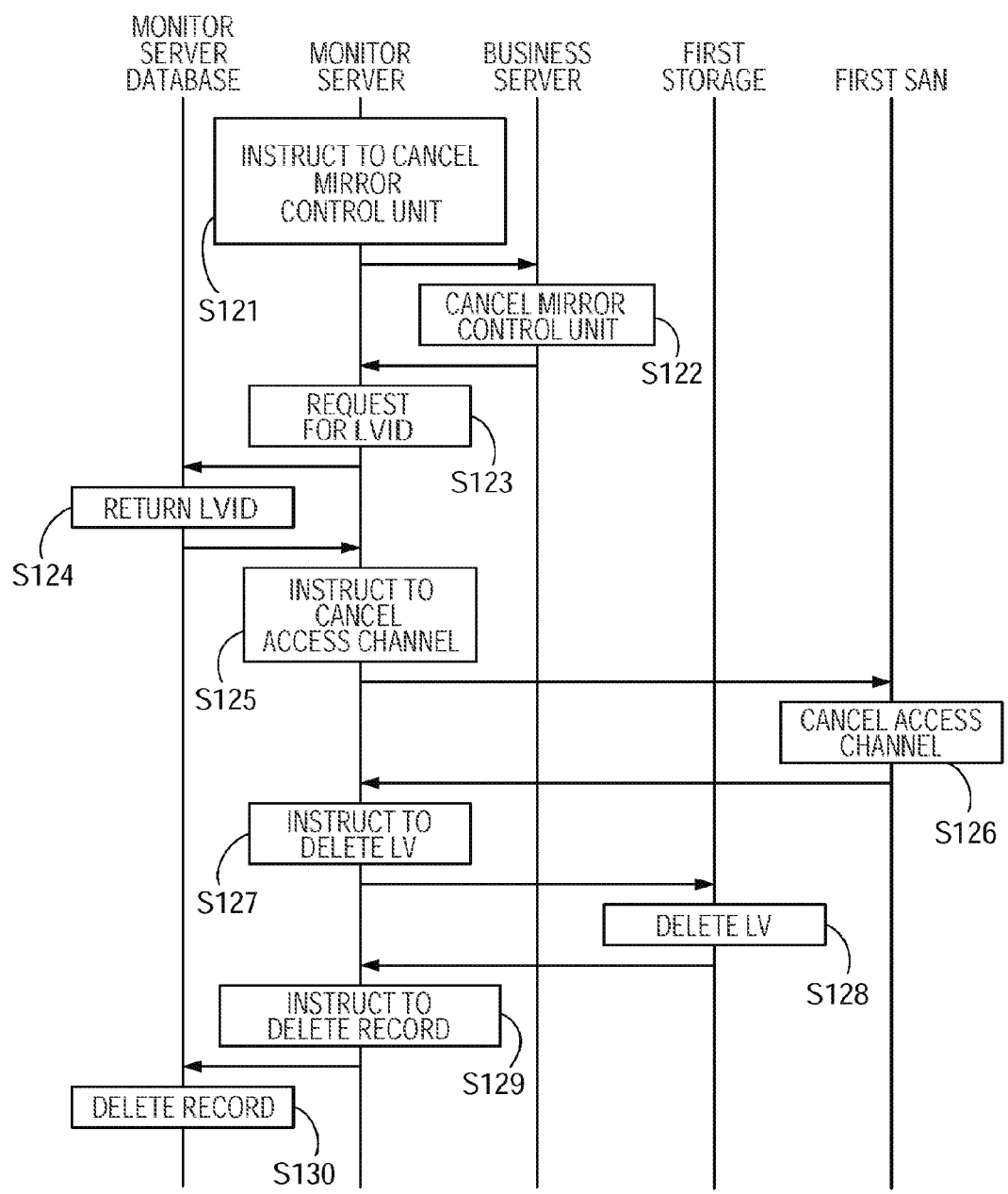
FIG. 21 is a sequence chart illustrating an example of a process of cancelling the monitoring of a server.

Next, a process (hereinafter, referred to as a process of cancelling the monitoring of a server) of excluding a to-be-monitored server from targets for the monitoring will be described with reference to an example of a sequence chart of FIG. 21.

For example, an operator who operates the monitor server 12 inputs information (hereinafter, referred to as server exclusion setting information) regarding a to-be-excluded business server 11. The monitor server 12 receives the input of the server exclusion setting information.

The server exclusion setting information includes, for example, information (a user name, a password, an IP address of a business server 11, and the like) for an access and information such as an IP address of a port coupled to the first SAN 15.

The monitor server control unit 45 instructs the to-be-excluded business server 11 to cancel the function of the mirror control unit 34, on the basis of the server exclusion setting information (S121). The business server control unit 33 of the business server 11 cancels the function of the mirror control unit 34 in accordance with the instruction (S122).

For example, the monitor server control unit 45 may transmit an uninstallation program for deleting the mirror program realizing the mirror control unit 34 to the to-be-excluded business server 11.

In this case, the to-be-excluded business server 11 executes the uninstallation program to thereby cancel the function of the mirror control unit 34. Thereby, log information is not copied to the first storage device 13 from the to-be-excluded business server 11.

The monitor server control unit 45 requests the monitor server database 47 to acquire, from the monitor server table, an LVID which corresponds to an IP address of the to-be-excluded business server 11 (S123). The monitor server database 47 returns the LVID in the monitor server table, which corresponds to the IP address of the to-be-excluded business server 11 (S124).

The monitor server control unit 45 instructs the first SAN 15 to cancel the established first SAN access channel (the access channel between the to-be-excluded business server 11 and the first storage device 13) (S125). The first SAN 15 controls a switch or the like to thereby cancel the first SAN access channel in accordance with the instruction (S126).

The monitor server control unit 45 instructs the first storage device 13 to delete a logical volume of the first storage device 13, which is identified by the LVID acquired in S123 (S127). The first storage device 13 deletes the logical volume in accordance with the instruction (S128).

The monitor server control unit 45 instructs the monitor server database 47 to delete a record of the monitor server table, which corresponds to the LVID acquired in S123 (S129). The monitor server database 47 deletes the record from the monitor server table in accordance with the instruction (S130).

Figure 22:
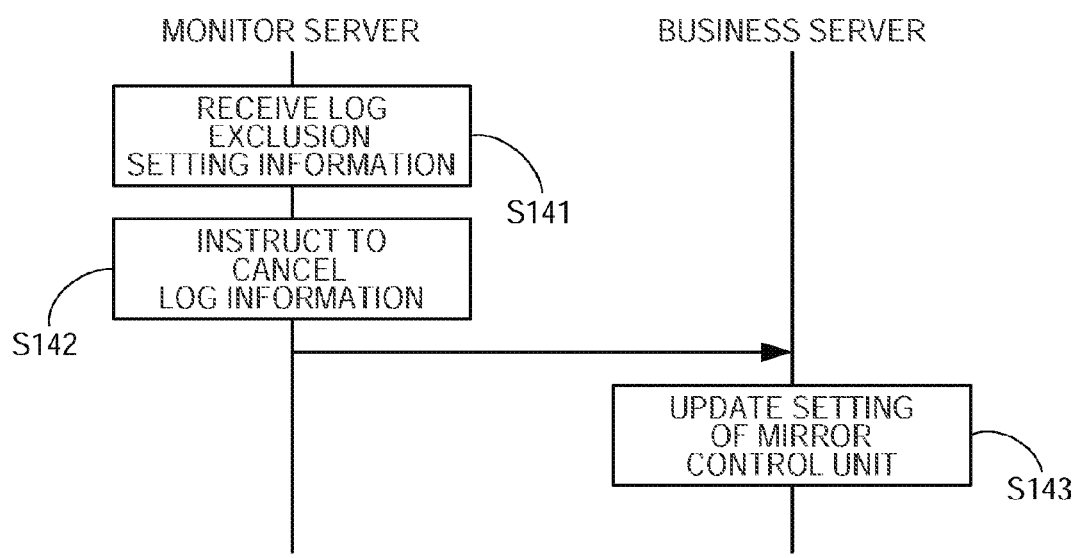
FIG. 22 is a sequence chart illustrating an example of a process of cancelling the monitoring of a log.

Next, a process (hereinafter, referred to as a process of cancelling the monitoring of a log) of excluding a to-be-monitored log from targets for the monitoring will be described with reference to an example of a sequence chart of FIG. 22.

For example, an operator who operates the monitor server 12 inputs information (hereinafter, referred to as log exclusion setting information) regarding a to-be-excluded log, which is log information to be excluded, to the monitor server 12. The monitor server 12 receives the input of the log exclusion setting information (S141).

The log exclusion setting information includes, for example, information (a user name, a password, an IP address of the business server 11, and the like) for making the monitor server 12 access the business server 11, and the like.

The monitor server control unit 45 instructs the business server 11 to exclude the to-be-excluded log from targets for the monitoring, on the basis of the log exclusion setting information (S142). The mirror control unit 34 of the business server 11 updates the setting so as to exclude the to-be-monitored log in accordance with the instruction (S143).

Thereby, the mirror control unit 34 does not perform control of copying the to-be-excluded log to a logical volume of the first storage device 13 on the basis of the updated setting.

In a case where the mirror control unit 34 is realized by execution of the mirror program, the mirror program may be executed again to reflect the updated setting on the mirror control unit 34.

The monitor server control unit 45 may transmit a program (log information exclusion program) for excluding a to-be-monitored log to the business server 11. The log information exclusion program includes information regarding the to-be-excluded log.

The business server 11 executes the log information exclusion program to thereby set the mirror control unit 34 not to mirror the to-be-monitored log.

Figure 23:
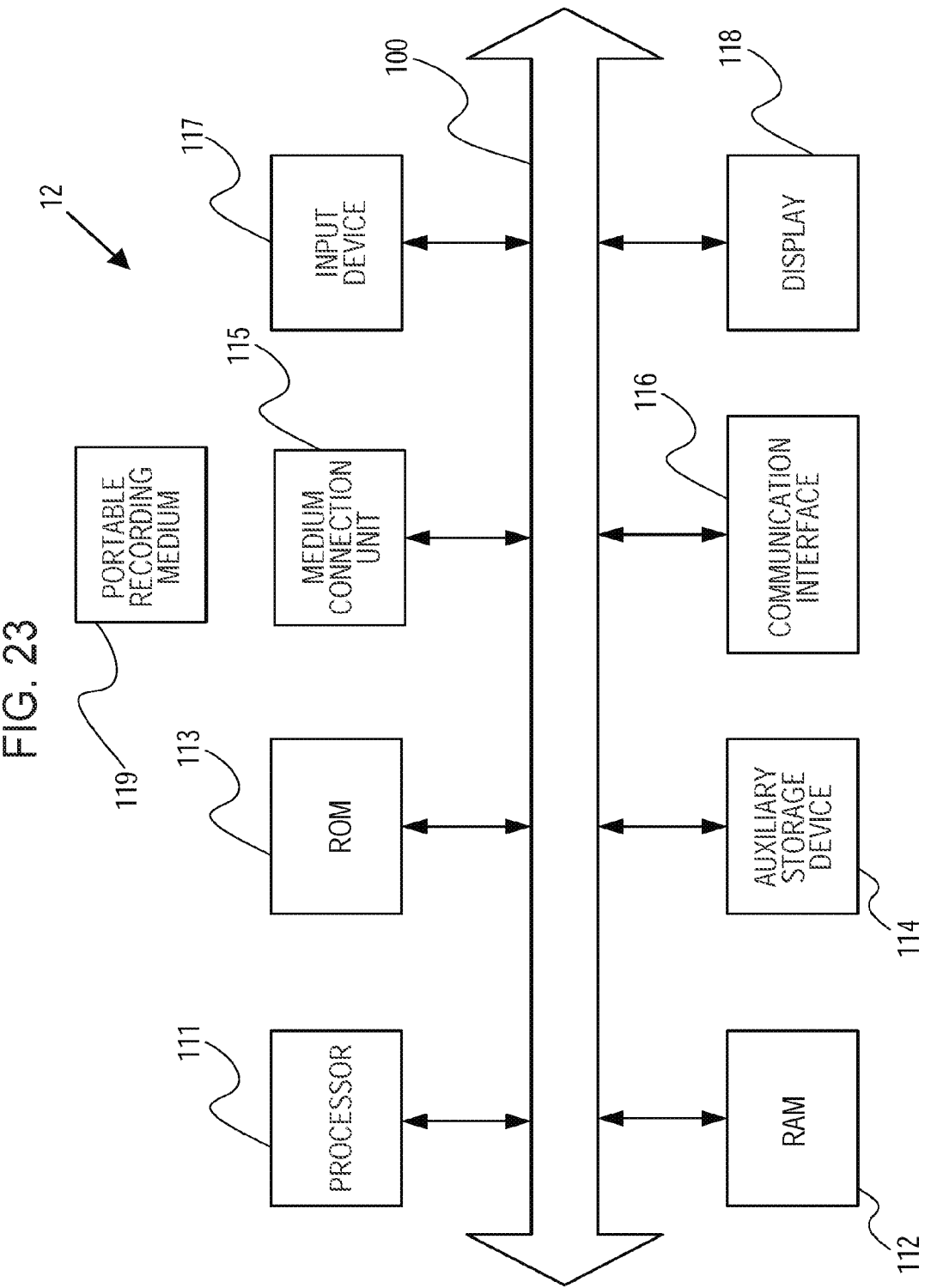
FIG. 23 is a diagram illustrating an example of a hardware configuration of a monitor server.

Next, an example of a hardware configuration of the monitor server 12 will be described with reference to an example of FIG. 23. As illustrated in the example of FIG. 23, a processor 111, a random access memory (RAM) 112, a read-only memory (ROM) 113, an auxiliary storage device 114, a medium connection unit 115, a communication interface 116, an input device 117, and a display 118 are coupled to a bus 100.

The processor 111 is any processing circuit. For example, a central processing unit (CPU) may be applied to the processor 111. The processor 111 of the monitor server 12 is an example of a third processor.

The processor 111 executes a program loaded into the RAM 112. The log information collection program for performing the process according to the embodiment may be applied as the program to be executed. The ROM 113 is a non-volatile storage device that stores therein the program loaded into the RAM 112.

The auxiliary storage device 114 is a storage device that stores therein various pieces of information. For example, a hard disk drive, a semiconductor memory, or the like may be applied to the auxiliary storage device 114. The medium connection unit 115 is provided so as to be connectable to a portable recording medium 119. The communication interface 116 is an interface that communicates with the outside.

The input device 117 is a device for performing any input with respect to the monitor server 12. For example, the input device 117 may be a keyboard, a mouse, or the like. The monitor server 12 receives an input from the input device 117. The display 118 is a display device that displays predetermined information.

A portable memory or an optical disk (for example, a compact disk (CD), a digital versatile disk (DVD), or the like) may be applied as the portable recording medium 119. The log management program for performing the process according to the embodiment may be recorded in the portable recording medium 119.

In the monitor server 12, units other than the monitor server database 47 may be realized by the processor 111 executing a given program. The monitor server database 47 may be realized by the RAM 112, the auxiliary storage device 114, and the like.

Each of the RAM 112, the ROM 113, the auxiliary storage device 114, and the portable recording medium 119 is an example of a tangible computer-readable recording medium. These tangible recording media are not transitory media such as signal carrier waves.

Figure 24:
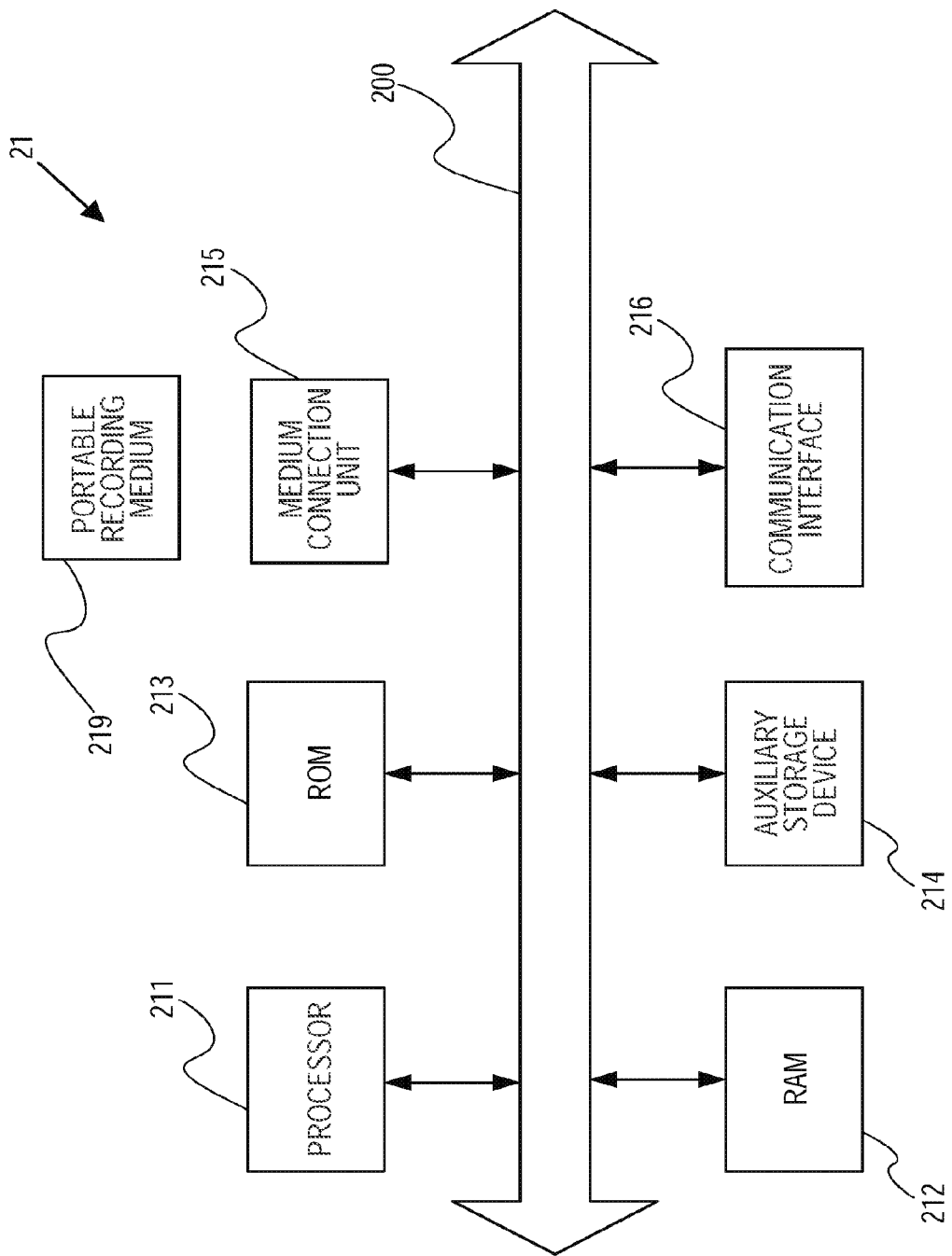
FIG. 24 is a diagram illustrating an example of a hardware configuration of a management server.

Next, an example of a hardware configuration of the management server 21 will be described with reference to an example of FIG. 24. As illustrated in the example of FIG. 24, a processor 211, a RAM 212, a ROM 213, an auxiliary storage device 214, a medium connection unit 215, and a communication interface 216 are coupled to a bus 200.

The processor 211 is any processing circuit. For example, a CPU may be applied to the processor 211. The processor 211 of the management server 21 is an example of a fourth processor.

The processor 211 executes a program loaded into the RAM 212. The ROM 213 is a non-volatile storage device that stores therein the program loaded into the RAM 212.

The auxiliary storage device 214 is a storage device that stores therein various pieces of information. For example, a hard disk drive, a semiconductor memory, or the like may be applied to the auxiliary storage device 214. The medium connection unit 215 is provided so as to be connectable to a portable recording medium 219. The communication interface 216 is an interface that communicates with the outside.

A portable memory or an optical disk may be applied as the portable recording medium 219. A program for performing the process according the embodiment may be recorded in the portable recording medium 219.

In the management server 21, units other than the management server database 56 may be realized by the processor 211 executing a given program. The management server database 56 may be realized by the RAM 212, the auxiliary storage device 214, and the like.

Each of the RAM 212, the ROM 213, the auxiliary storage device 214, and the portable recording medium 219 is an example of a tangible computer-readable recording medium. These tangible recording media are not transitory media such as signal carrier waves.

Figure 25:
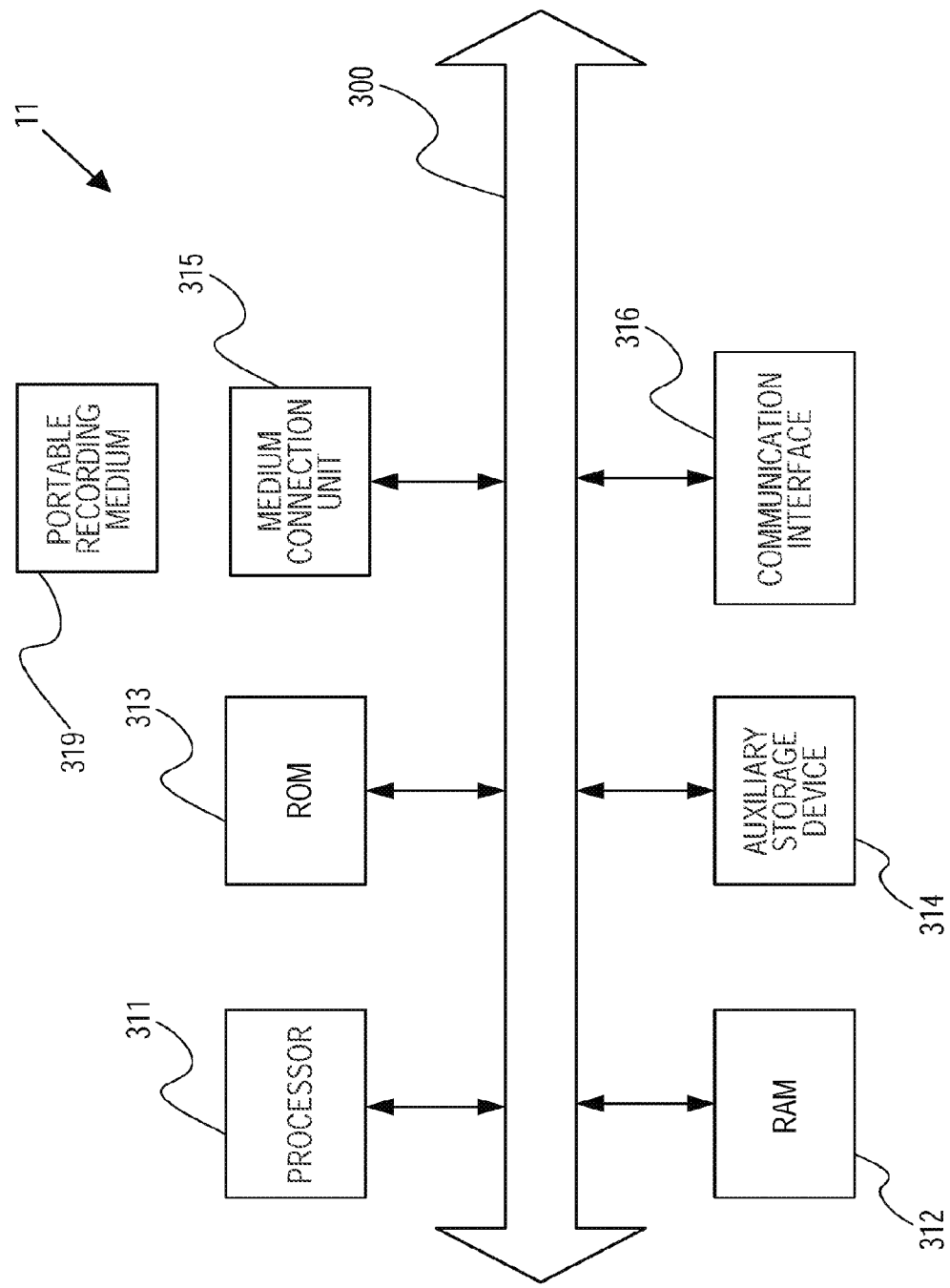
FIG. 25 is a diagram illustrating an example of a hardware configuration of a business server.

Next, an example of a hardware configuration of the business server 11 will be described with reference to an example of FIG. 25. As illustrated in the example of FIG. 25, a processor 311, a RAM 312, a ROM 313, an auxiliary storage device 314, a medium connection unit 315, and a communication interface 316 are coupled to a bus 300.

The processor 311 is any processing circuit. For example, a CPU may be applied to the processor 311. The processor 311 of the business server 11 is an example of a second processor.

The processor 311 executes a program loaded into the RAM 312. The ROM 313 is a non-volatile storage device that stores therein the program loaded into the RAM 312.

The auxiliary storage device 314 is a storage device that stores therein various pieces of information. For example, a hard disk drive, a semiconductor memory, or the like may be applied to the auxiliary storage device 314. The medium connection unit 315 is provided so as to be connectable to a portable recording medium 319. The communication interface 316 is an interface that communicates with the outside.

A portable memory or an optical disk may be applied as the portable recording medium 319. A program for performing the process according to the embodiment may be recorded in the portable recording medium 319.

In the business server 11, units other than the storage unit 35 may be realized by the processor 311 executing a given program. The storage unit 35 may be realized by the auxiliary storage device 114 and the like.

Each of the RAM 312, the ROM 313, the auxiliary storage device 314, and the portable recording medium 319 is an example of a tangible computer-readable storage medium. These tangible storage media are not transitory media such as signal carrier waves.

Figure 26:
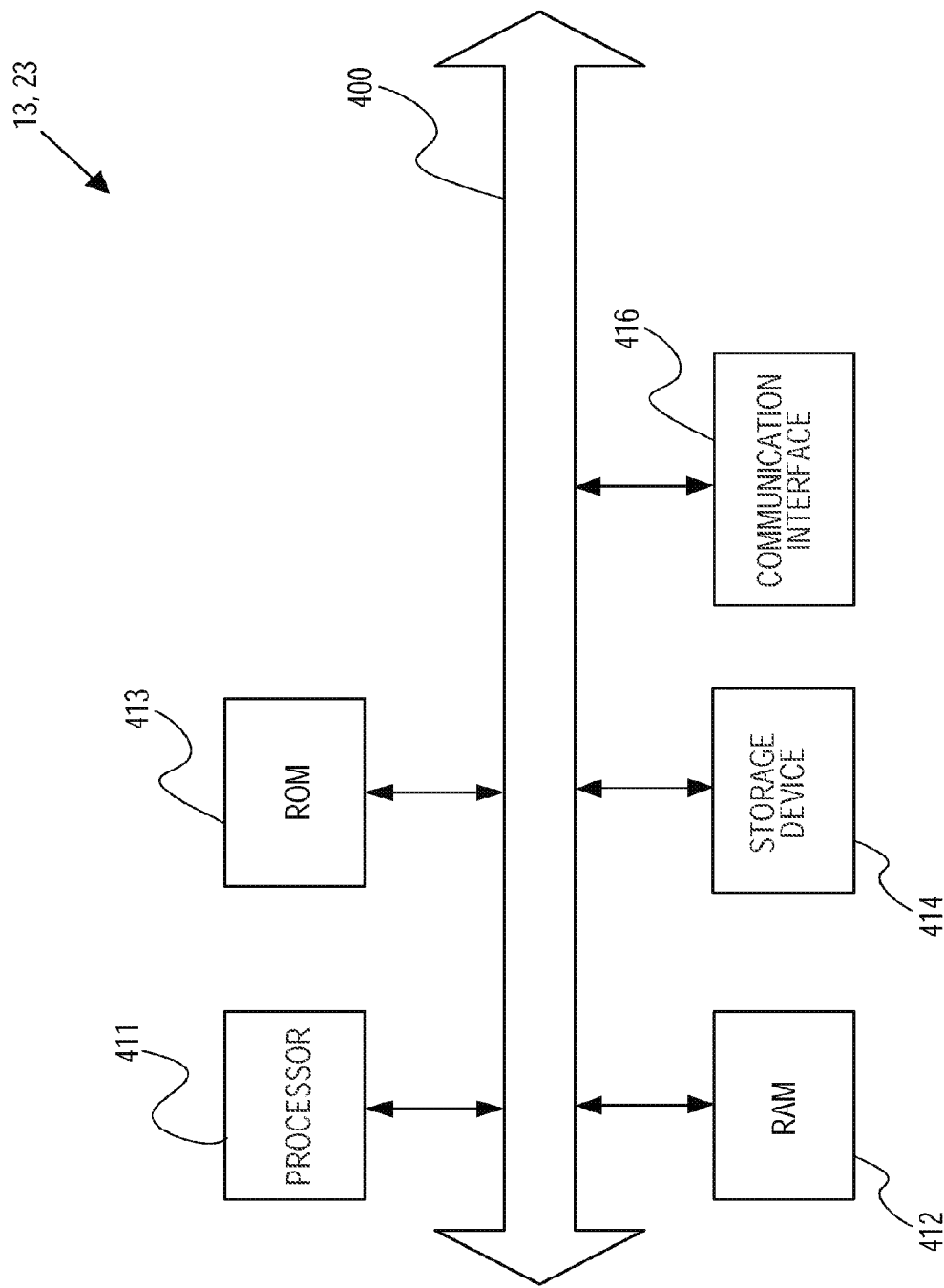
FIG. 26 is a diagram illustrating an example of a hardware configuration of a storage device.

Next, an example of a hardware configuration of the first storage device 13 and the second storage device 23 will be described with reference to an example of FIG. 26. As illustrated in the example of FIG. 26, a processor 411, a RAM 412, a ROM 413, a storage device 414, and a communication interface 416 are coupled to a bus 400.

The processor 411 is any processing circuit. For example, a CPU may be applied to the processor 411. The processor 411 of the first storage device 13 is an example of a first processor.

The processor 411 executes a program loaded into the RAM 412. The ROM 413 is a non-volatile storage device that stores therein the program loaded into the RAM 412.

The storage device 414 is a storage device that stores therein various pieces of information. For example, a hard disk drive, a semiconductor memory, or the like may be applied to the storage device 414. The communication interface 416 is an interface that communicates with the outside.

In the first storage device 13 and the second storage device 23, units other than the mirror storage unit 63 may be realized by the processor 411 executing a given program. The mirror storage unit 63 may be realized by the storage device 414 and the like.

According to the above-described embodiment, when the business server 11 adds log information to the storage unit 35 or updates log information stored in the storage unit 35, the added log information or the updated information is stored in a logical volume allocated to the business server 11 in the first storage device 13.

When it is detected that a failure has occurred in the business server 11, the management server 21 collects log information from the first storage device 13 or the second storage device 23, and thus a load for collecting log information on the business server 11 is reduced.

In the embodiment, an example in which a storage device is coupled to a server by the SAN is described, but the storage device may be coupled to any storage network other than the SAN. For example, the storage device may be a network attached storage (NAS), or the like.

In this case, a shared folder may be dynamically created in the NAS, and the business server 11 may be allocated to the shared folder.

In the embodiment, an example in which each of the business servers 11 is realized by one physical computer is described, but the business servers 11 may be a plurality of virtual machines on one physical computer. In this case, a guest OS operating in each virtual machine communicates with the first storage device 13. The OS is short for an operating system.

In a case where the business servers 11 are realized by the virtual machines, a logical volume of the first storage device 13 may be allocated to the virtual machine. For example, in this case, a shared folder is created in the logical volume.

In a case where the first storage device 13 stores therein not only log information but also information regarding a process performed by the business server 11, log information regarding the first storage device 13 may be collected.

Log information regarding the first storage device 13 may be collected by the monitor server 12 being coupled to the first SAN 15. In this case, a logical volume of the first storage device 13 is allocated to the monitor server 12.

The monitor server 12 mounts the logical volume allocated to the monitor server 12. Thereby, the logical volume is recognized by the monitor server 12. The monitor server 12 causes the first storage device 13 to perform a function of collecting log information regarding the first storage device 13.

A storage device may have a function of collecting log information regarding the storage device itself. The monitor server 12 may cause the first storage device 13 to perform this function.

The monitor server 12 performs control of storing the collected log information regarding the first storage device 13 in a logical volume allocated to the monitor server 12. Thereby, the log information regarding the first storage device 13 is stored in the logical volume allocated to the monitor server 12 in the first storage device 13.

The management server 21 collects log information regarding the first storage device 13 from the logical volume through the monitor server 12, thereby collecting the log information regarding the first storage device 13.

A to-be-collected log may be designated on the basis of predetermined template information. For example, an operator who operates the monitor server 12 may designate a to-be-collected log, using the input device 117 on the basis of the predetermined template information displayed on the display 118.

For example, the template information is information in which an application operating in the business server 11 and the to-be-collected log are associated with each other. When the monitor server 12 accepts the designation of an application, the monitor server 12 identifies log information corresponding to the application on the basis of the template information.

The identified log information is the to-be-collected log. Accordingly, the to-be-collected log may be designated on the basis of template information even when the log information is not directly designated.

The system 1 according to the embodiment may be applied to, for example, a cloud computing system. In the cloud computing system, the business server 11 according to the embodiment may be applied to a server that provides a service.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A log information collection system, comprising:
to-be-monitored devices, each coupled to a first storage device, the to-be-monitored devices each including:
a first memory, and
a first processor coupled to the first memory;
a monitor device coupled to the first storage device and the to-be-monitored devices, and the monitor device including:
a second memory, and
a second processor coupled to the second memory, the second processor configured to:
allocate a storage region of the first storage device to each of the to-be-monitored devices, and
control each of the to-be-monitored devices to copy first log information among log information stored in the first memory to the allocated storage region, the first log information being designated in advance; and
a management device coupled to the monitor device and the management device including:
a third memory, and
a third processor coupled to the third memory, the third processor configured to:
collect the first log information stored in the first storage device, when a failure occurred in any of the to-be-monitored devices is detected, by accessing a second storage device to which the first log information is copied from the first storage device or by accessing the first storage device through a first access channel established between the management device and the first storage device, the first access channel including none of the monitor device and the to-be-monitored devices.

2. The log information collection system according to claim 1, wherein the second processor is configured to:
allocate different storage regions of the first storage device to the respective to-be-monitored devices.

3. The log information collection system according to claim 1, wherein the first processor is configured to:

transmit, when the first log information stored in the storage unit is updated, information corresponding to an updated portion of the first log information to the first storage device to thereby control the first storage device to update the first log information stored in the allocated storage region of the first storage device.

4. The log information collection system according to claim 1, further comprising:
a first network configured to:
enable communications at a higher speed than that of a second network used for communicably coupling the management device to the monitor device, and
communicably couple the monitor device to each of the to-be-monitored devices; and
a third network configured to:
enable communications at a higher speed than that of the first network, and
communicably couple each of the to-be-monitored devices to the first storage device.

5. The log information collection system according to claim 4, wherein the second processor is configured to:
control each of the to-be-monitored devices to establish an access channel of the third network to the first storage device.

6. The log information collection system according to claim 1, wherein the second processor is configured to:
control, when a first communication channel between the first storage device and the second storage device is detected, the first storage device to copy the first log information stored in the first storage device to the second storage device, and
control, when the first communication channel is not detected, a communication device to establish the first access channel, the communication device being different from the monitor device and the to-be-monitored devices.

7. The log information collection system according to claim 1, wherein the second processor is configured to:
receive a first designation of a new to-be-monitored device, and
allocate a new storage region of the first storage device to the new to-be-monitored device upon receiving the first designation.

8. The log information collection system according to claim 1, wherein the second processor is configured to:
receive a first designation of second log information to be newly monitored, and
control, upon receiving the first designation, each of the to-be-monitored devices to copy the second log information stored in the storage unit to the allocated storage region.

9. The log information collection system according to claim 1, wherein the third processor is configured to:
allocate a first storage region of the second storage device to the management device, the first storage region storing therein the first log information copied from the first storage device.

10. The log information collection system according to claim 9, wherein the third processor is configured to:
cancel the allocation of the first storage region upon completing collection of the first log information.

11. The log information collection system according to claim 6, wherein the second processor is configured to:
receive a notice indicating completion of collection of the first log information from the management device, and
cancel the first access channel upon receiving the notice.

12. The log information collection system according to claim 1, wherein the second processor is configured to:
receive a first designation of a to-be-monitored device to be canceled to be monitored, and
cancel, upon receiving the first designation, the allocation of the storage region allocated to the designated to-be-monitored device.

13. The log information collection system according to claim 1, wherein the second processor is configured to:
receive a first designation of log information to be canceled to be monitored, and
control, upon receiving the first designation, each of the to-be-monitored devices to exclude the designated log information from the first log information to be copied to the first storage device.

14. A non-transitory computer-readable recording medium having stored therein a program that causes a log information collection system to execute a process, the log information collection system including a monitor device and a management device coupled to the monitor device, the monitor device including a first processor, the management device including a second processor, the process comprising:
allocating, by the first processor, a storage region of a first storage device to each of to-be-monitored devices coupled to the first storage device, the first storage device being coupled to the monitor device, each of the to-be-monitored devices being coupled to the monitor device;
control, by the first processor, each of the to-be-monitored devices to copy first log information among log information stored in a first memory included in each of the to-be-monitored devices to the allocated storage region, the first log information being designated in advance; and
collecting by the second processor, when a failure occurred in any of the to-be-monitored devices is detected, the first log information stored in the first storage device by accessing a second storage device to which the first log information is copied from the first storage device or by accessing the first storage device through a first access channel established between the management device and the first storage device, the first access channel including none of the monitor device and the to-be-monitored devices.

15. A log information collection method, comprising:
allocating, by a first processor included in a monitor device, a storage region of a first storage device to each of to-be-monitored devices coupled to the first storage device, the first storage device being coupled to the monitor device, each of the to-be-monitored devices being coupled to the monitor device;
control, by the first processor, each of the to-be-monitored devices to copy first log information among log information stored in a first memory included in each of the to-be-monitored devices the allocated storage region, the first log information being designated in advance; and
collecting by a second processor included in a management device coupled to the monitor device, when a failure occurred in any of the to-be-monitored devices is detected, the first log information stored in the first storage device by accessing a second storage device to which the first log information is copied from the first storage device or by accessing the first storage device through a first access channel established between the management device and the first storage device, the first access channel including none of the monitor device and the to-be-monitored devices.

\* \* \* \* \*